United States Patent [19]

Mochizuki

[11] Patent Number: 4,737,068
[45] Date of Patent: Apr. 12, 1988

[54] AUTOMATIC SUPPLY AND STORAGE SYSTEM FOR MACHINED MATERIALS

[75] Inventor: Nobumasa Mochizuki, Kawagoe, Japan

[73] Assignees: Mochizuki Precision Machine Industry Ltd. Co.; Amada Company, Limited, both of Japan

[21] Appl. No.: 868,731

[22] Filed: May 30, 1986

[30] Foreign Application Priority Data

May 31, 1985 [JP] Japan .................. 60-119235

[51] Int. Cl.$^4$ .................. B65G 47/74
[52] U.S. Cl. .................. 414/745; 83/155; 83/158; 83/436; 198/346.2; 198/720; 198/803.14
[58] Field of Search .................. 83/279, 280, 436, 158, 83/155; 209/517, 518, 521; 198/434, 720, 346.2, 803.14, 803.15, 477.1, 349; 414/745, 47

[56] References Cited

U.S. PATENT DOCUMENTS

| | | | |
|---|---|---|---|
| 3,193,084 | 7/1965 | Bauer et al. | 414/745 |
| 3,466,958 | 9/1969 | Munson | 83/280 X |
| 3,895,723 | 7/1975 | Stolzer | 198/349 X |
| 4,185,672 | 1/1980 | Vit et al. | 209/518 X |
| 4,312,444 | 1/1982 | Mushovic | 83/436 X |
| 4,506,571 | 3/1985 | Jensen et al. | 83/280 X |

*Primary Examiner*—Stephen J. Novosad
*Assistant Examiner*—Matthew Smith
*Attorney, Agent, or Firm*—Wigman & Cohen

[57] ABSTRACT

An automatic supply and storage system for machined materials includes; a feed conveyor which aligns and recycles a plurality of machined materials; a delivery conveyor which moves back and forth from the conveying area of the feed conveyor to advance and receive back the machined materials and to convey the machined materials for further processing in a direction transverse to the conveying direction of the feed conveyor; and a storage conveyor having a plurality of buckets which are intermittently recycled to store the machined materials, after further machining, in a prescribed bucket. The buckets have an aperture section which can be opened and closed in both the vertical and sideways directions. The system thus has the capability of feeding the machined materials to a machine tool, and after feeding a specified amount, sending the materials back to the feed conveyor.

Also, a remnant selection device is positioned in the discharge end direction of the delivery conveyor to form a machined material transportation passage conforming to the quantity of machined material remnants. Remnants which are shorter than a prescribed length are rejected. A remnant collection hook which engages remnants which exceed the prescribed length and returns the remnants to the delivery conveyor then to the feed conveyor.

A prestock passage aligns and stores the materials after processing and is movable to a push-out position in a direction transverse to the direction of delivery of the materials from the prestock passage to the storage conveyor.

8 Claims, 18 Drawing Sheets

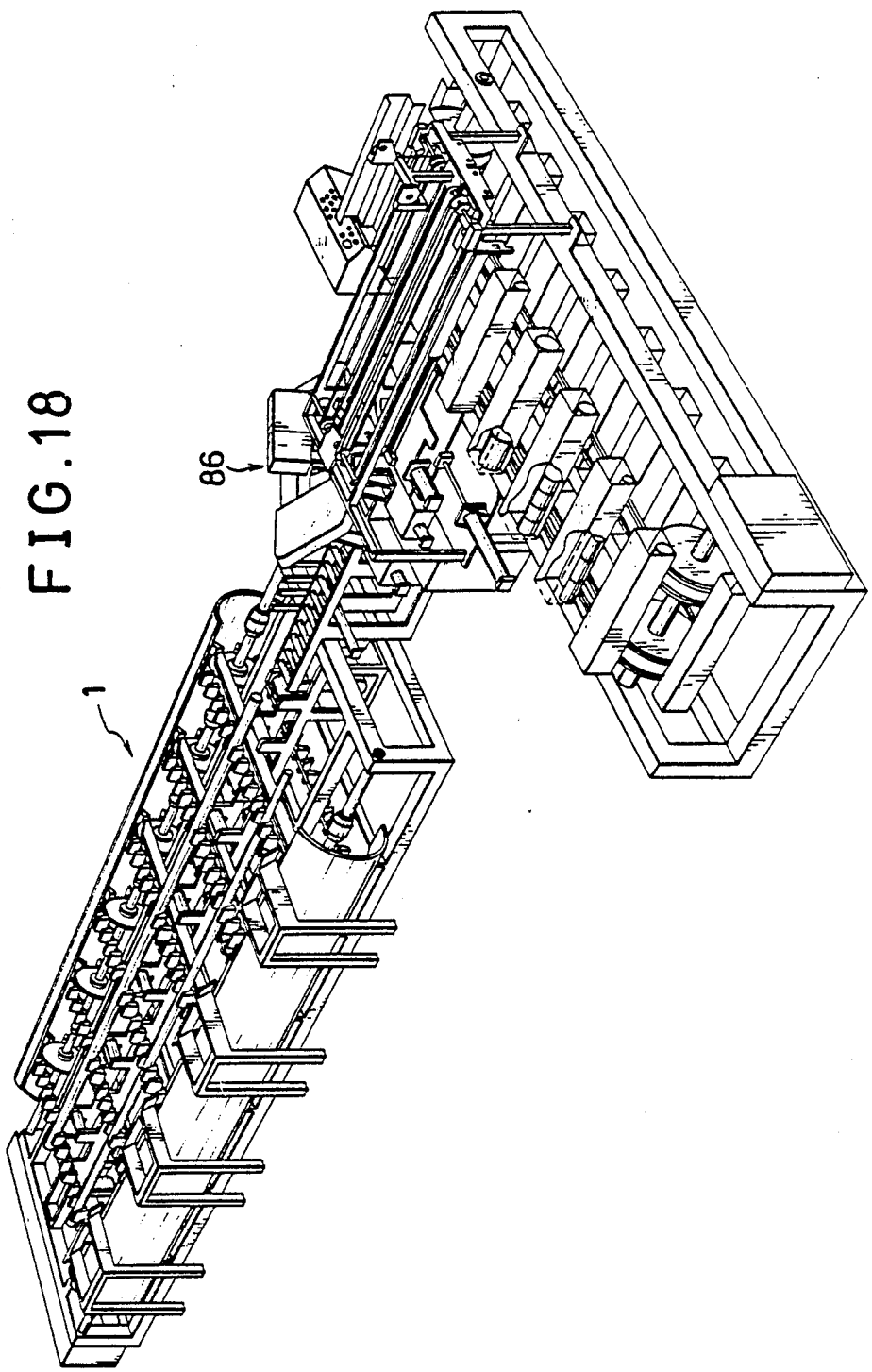

AUTOMATIC SUPPLY AND STORAGE SYSTEM FOR MACHINED MATERIALS

The present invention relates to an automatic supply and storage system for machined materials wherein, for example, a plurality of types of steel materials differing in geometrical form and quality are selectively supplied to a machine tool, the processed goods are classified by geometrical form and quality and systematically stored, and the remnant is classified according to the residual quantity, and wherein a choice can be made whether or not to utilize it for the system.

DESCRIPTION OF THE RELATED ART

Steel materials such as, for example, round rods which have many uses as materials to be machined in a machine tool, are usually cut to the proper length in a sawing machine prior to machining, then the machining process is carried out. However, in this cutting operation it is essential that the steel materials be supplied to the sawing machine in the proper quantities, the operation be performed with good efficiency, and the sawn material be systematically stored in a set location for future use. With this type of requirement, the geometrical shape and quality especially, as well as the cutting length and quantity, differ, item by item. These provisions are very important when processing different types and different amounts.

In this case, the cutting of this type of material is done in advance, with no direct reference to the machining process. Therefore if this type of operation is carried out during normal working hours, and if manpower is required for it, the cutting is not rationalized, so that productivity is lowered. Accordingly, it is desirable that normal working hours be avoided for this type of operation as far as possible and that provision be made for mechanization with reduction of manpower requirements.

These requirements are handled conventionally by having the operator select the prescribed steel material and set up to supply a sawing machine provided with control equipment. At this time the prescribed cutting length is input into the memory of the machine, and the sawing machine is driven based on this set input, so that the steel material is automatically cut to a fixed length.

With this conventional method a tentative rationalization of the relationship between the supplying of the steel material and the cutting is possible. However, when the steel material which was originally selected has all been sawn, it is necessary to once again select the steel material and set the feed to the sawing machine. As a result, an operator must monitor this operation, making complete mechanization and labor saving very difficult. Accommodating the cut material in non-uniform lengths in a storage container also becomes a problem. In addition, this is not practical because storage containers have to be made ready to correspond to the geometry and quality of the steel material, as well as the cut lengths and the quantity, so a great deal of space must be set aside for storage.

SUMMARY OF THE INVENTION

An object of the present invention is to provide, with due consideration to the drawbacks of such conventional devices, an automatic supply and storage system for machined materials which can selectively supply a plurality of types of steel materials, differing in geometrical form and quality, as machined materials to a processing machine, classify the processed goods by geometrical form and quality and systematically store them, then classify the remnant according to the residual quantity. In providing for their different utilization, the entire process, from supply to storage of the machined materials and handling of the remnant, is carried out automatically and continuously, thus providing for the mechanization and man-power reduction of this type of process.

In order to accomplish this object, the automatic supply and storage system for machined materials of the present invention comprises a feed conveyor which can line up and recycle a plurality of machined materials; a delivery conveyor movable back and forth from the conveying area of the feed conveyor, from which it is possible to send the machined materials to the feed conveyor and to send it in the intersecting direction with reference to the conveying direction of the feed conveyor; and a storage conveyor in which it is possible to intermittently recycle a plurality of buckets in which an aperture section in both the vertical and sideways directions can be opened and closed. In addition, the system of the present invention comprises a delivery conveyor with a guide roller which has been positioned in the intersecting direction with reference to the conveying direction of the feed conveyor to go back and forth from the transportation area of the feed conveyor to guide the movement of the machined materials.

The system of the present invention also comprises a remnant selection device positioned in the discharge end direction of the delivery conveyor, which can form a machined materials transportation passage conforming to the quantity of machined material remnants and in addition the system comprises a remnant collection device with a collection hook positioned in the discharge end direction of the delivery conveyor, which can engage the end surface of the remnants of the machined materials and can return the remnants in the direction of the remnant selection device.

Next, in the system of the present invention, a prestock passage, which lines up and stores the machined materials after processing, is provided at the front of the storage conveyor, and at the time that the machined materials are processed, the prestock passage is positioned at the rear end of the conveying area for the machined materials which contact the delivery conveyor. After the prescribed quantity of the machined materials is stored, the machined materials can be discharged to the buckets of the storage conveyor at a set position retarded from the previously mentioned position. For this reason, a push plate is provided which can go in and out of the prestock passage, and engage the rear end section of the machined materials which are stored in the prestock passage. A check down mechanism is also provided to prevent the rolling of the machined materials.

Furthermore, in the system of the present invention a rotatable side cover is provided on both sides of each bucket on the storage conveyor. This side cover is normally rotated to the closed position, covering the sideways opening section of the side cover, and only when the bucket moves to a position directly opposite the prestock passage does the side cover rotate into the open position, uncovering its sideways opening section, so that the bucket and the prestock passage are in contact. In addition, a movable bed is interveningly provided between the bucket of the storage conveyor and the prestock passage, and a clearance check mechanism is provided which can create a conveyance route for the machined materials between the prestock passage and the bucket.

Those and other objects, features and advantages of the present invention will become more apparent from the following description of the preferred embodiment taken in conjunction with the accompanying drawings.

BRIEF DESCRIPTION OF THE DRAWINGS

FIG. 18 is a perspective view illustrating the whole construction of an embodiment incorporating the present invention.

DESCRIPTION OF THE PREFERRED EMBODIMENTS

Figure 1:
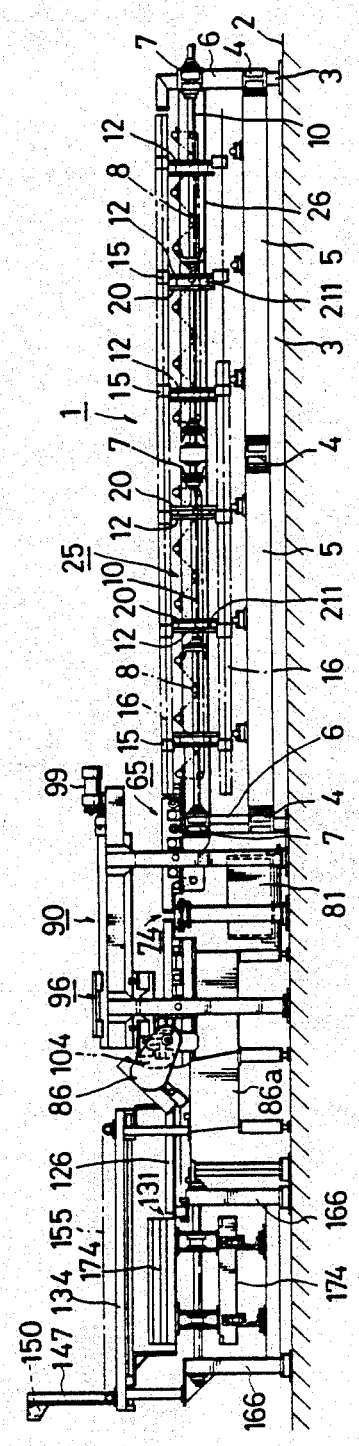
FIG. 1 is a front elevation showing one part of an embodiment of the system of the present invention.
Figure 2:
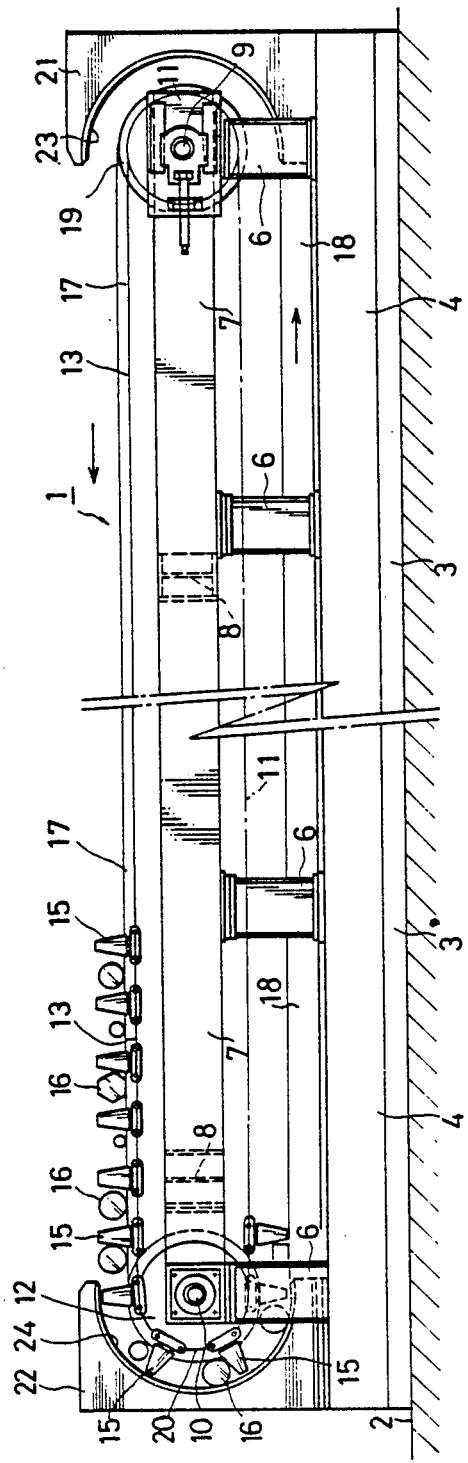
FIG. 2 is a front elevation showing an example of a feed conveyor of the present invention.

Now referring to FIGS. 1 to 2, which are drawings showing an embodiment of the system of the present invention, which feeds long steel materials as machined materials to a processing machine such as a bandsaw, lines up the machined materials after they have been cut, and stores them, a long feed conveyor 1 is mounted on a floor surface 2. On a base frame 3, which is an almost rectangular framework on the floor surface 2, is mounted a plurality of bottom side frames 4, 5 which are positioned transversely and longitudinally, respectively. A plurality of upper side frames 7, 8 is constructed longitudinally and transversely through a support frame 6 which is mounted vertically on the frame 4. A drive shaft 9 and a driven shaft 10 are supported in a freely rotatable manner on both ends of the upper side frame 7. A plurality of drive and driven sprockets 11 and 12, firmly mounted on the drive shaft 9 and the driven shaft 10 respectively, is provided. A chain 13 joins the sprockets 11 and 12 and can travel around their peripheries.

A plurality of almost ridge-shaped, thick-bodied attachments 15 are attached to each of a plurality of links 14 which comprise the chain 13, as shown in the drawings. Between the mutually adjacent attachments 15, machined material 16, which may be any of a large variety of different geometrical shapes and qualities, is accommodated. Each machined material 16 can be recycled, following along the circumferential path of the chain 13. The machined material 16 is supported on the upper side circumferential region of the chain 13, on a plurality of guide rails 17 which are secured to the upper side frame 8, so that the machined material 16 moves rotatingly or slidingly on the upper surface of the guide rails 17. The machined member 16 is also supported by a plurality of guide rails 18 which are secured to the lower side of the frame 5 at the lower side circumferential region of the chain 13. The machined material 16 moves rotatingly on the upper surface of the guide rails 18, which serves to lighten the load on the chain 13, by lightening the circumferential component of this load. The guide rails 17 and 18 are not limited to the rectangular or circular cross-sections shown in the drawings in this case, as many different types of cross-sectional shapes can be used. Also, in place of the rigid guide rails 17 and 18 of the type shown, a plurality of freely rotatable rollers can be used.

In addition, the machined material 16 is able to move to either the upper or lower side circumferential region at both ends of the circumferential travel, by means of a plurality of ring guides 19, 20 and a plurality of brackets 21, 22 which are mounted on the outside of the ring guides 19, 20. The ring guides 19, 20 comprise a disk constructed integrally on the drive and driven sprockets 11, 12 through a boss 211, and the guide surfaces are formed in an arcuate surface having almost the same diameter as the rotating radius of the base of the attachment 15. The brackets 21, 22 are erected on the lower side frame 4, and have a plurality of semicircular guide surfaces 23, 24 concentric with the sprockets 11, 12 on the inner circumferential surface opposing the drive and driven sprockets 11, 12. Then, the machined material 16 which is guided between the ring guides 19, 20 and the guide surfaces 23, 24, is engaged with the end surface of the attachment 15. Its movement is restrained at the guide surfaces 23, 24, and it is transferred to the guide rails 17, 18 so that the rotating stroke becomes possible.

In this case, if an accommodating concave hole is open on the guide surfaces 23, 24 of the ring guides 19, 20 for engagement of the machined material, at the time of the abovementioned rotating stroke, the load which acts on the chain 13 by the attachment 15 can be reduced. In addition, at that time the rolling of the machined material 16 is prevented and a smooth rotary action is obtained.

Figure 4:
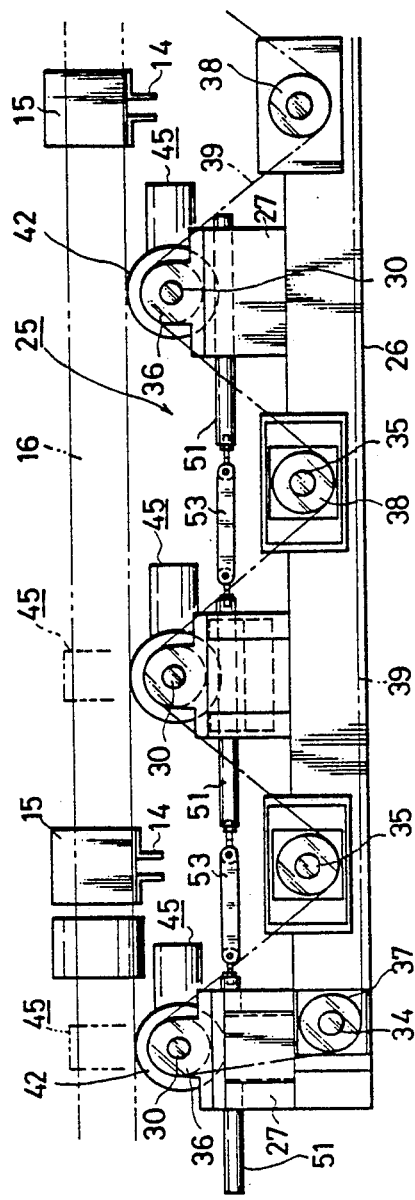
FIG. 4 is a front elevation showing an enlargement of the principal mechanism of the delivery conveyor of the present invention.
Figure 5:
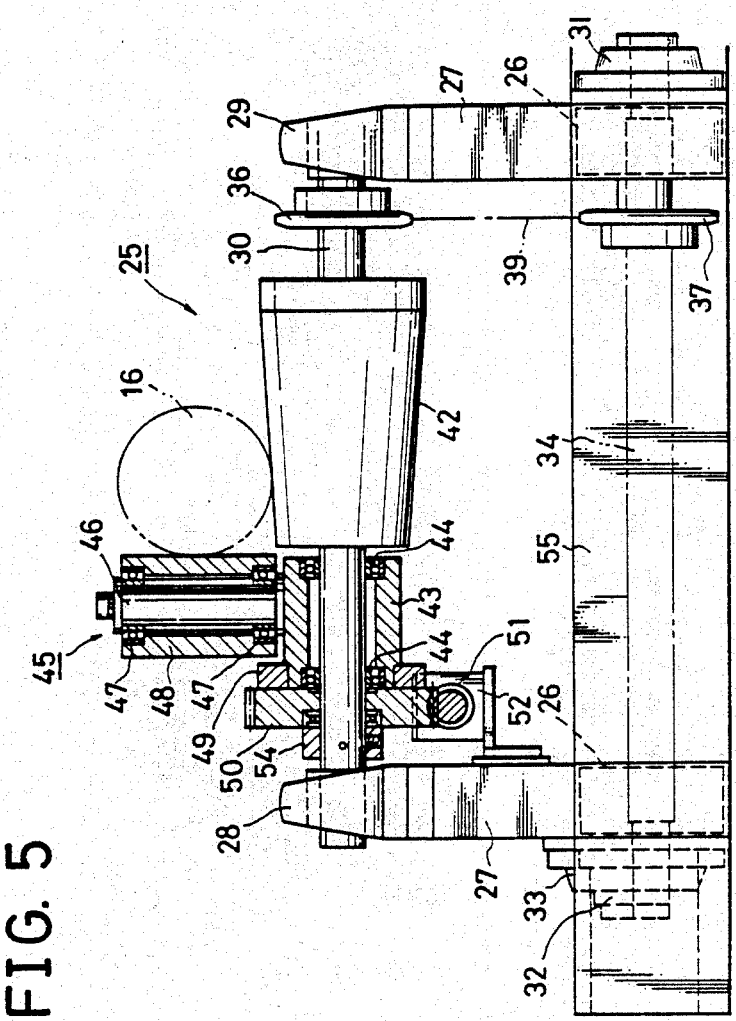
FIG. 5 is a sectional drawing showing an enlargement of the principal mechanism of the delivery conveyor of the present invention.

A delivery conveyor 25 is installed on the intermediate section of the transport stoke of the feed conveyor 1 in FIG. 5, with additional reference to FIG. 4 and the machined material can be transported in the direction transverse to the transport direction of the feed conveyor 1. Specifically, the delivery conveyor 25 has a pair of movable frames 26, 26 which are erected at almost the same height as the lower side frame 7. In the same interval positioning on the frames 26, through the medium of a load pedestal 27, a pair of bearings 28, 29 are opposedly positioned, and a plurality of roller shafts 30 are supported in a freely rotatable manner between the bearings 28, 29. Also a plurality of pairs of bearings 31, 32, and 33 is positioned in the opposing positions of the outer surface of the movable frames 26, 26. A plurality of freely rotatable shafts 34, 35 are rotatably supported by the bearings 31, 32, 33.

Figure 6:
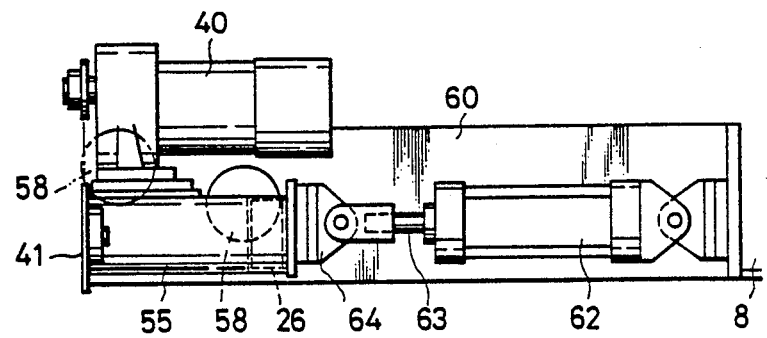
FIG. 6 and FIG. 7 are front elevations of the principal mechanism of the delivery conveyor of the present invention.

A plurality of sprockets 36, 37, 38 is secured to the roller shafts 30 and bearings 34, 35, and a single chain 39 runs between the sprockets 36, 37, 38, as shown in the drawings, and can rotate synchronously with the roller shafts 30. A drive sprocket 41, as seen in FIG. 6 which is connected to one of the sprockets 37, is directly connected to a motor 40. A roller 42 in the shape of a truncated cone is secured to the roller shafts 30 and can house the machined material 16 on its circumferential surface.

At a position close to the small-diameter side of the roller 42, a boss 43 is supported in a freely rotatable manner on the roller shaft 30 through a plurality of bearings 44. A guide roller 45 on the circumferential surface of the boss 43 is supported so that its shaft can rotate and move between horizontal and vertical attitudes. Specifically, a guide roller shaft 46 is provided to project from the circumferential surface of the boss 43. A roller 48 is supported in a freely rotatable manner so that its shaft can rotate on the circumferential surface of the shaft 46 through a bearing 47. Normally, the guide roller 45 is placed in a horizontal attitude, making possible circumferential rotation of the feed conveyor 1. When the machined material 16 is being transported, the roller 45 is erected in a vertical attitude and accommodates the machined material 16 transferred from the feed conveyor 1 on the roller 42. The circumferential surface of the machined material 16 is received by the guide roller 45, which guides the feed direction of the machined material 16.

Specifically, a gear 50 is loosely inserted in a freely rotatable manner into the roller shaft 30 on the side end of the boss 43, through a mounting plate 49, and a worm 51 engages the gear 50. The worm 51 is supported by a support 52 inserted into the inside of the load pedestal 27. A tie rod 53 is connected to each end of the worm 51. As shown in FIG. 4, the tie rods 53 are placed in a straight line, so they provide an integrated action. One end is secured and is immobile, and the other end is connected to the piston rod of a cylinder which is omitted from the drawings. The movement between horizontal and vertical attitudes of the guide roller 45 is made possible by the extension and retraction displacement of this piston rod. As shown in the drawings, a stop 54 is provided which restrains the movement of the gear 50.

Figure 7:
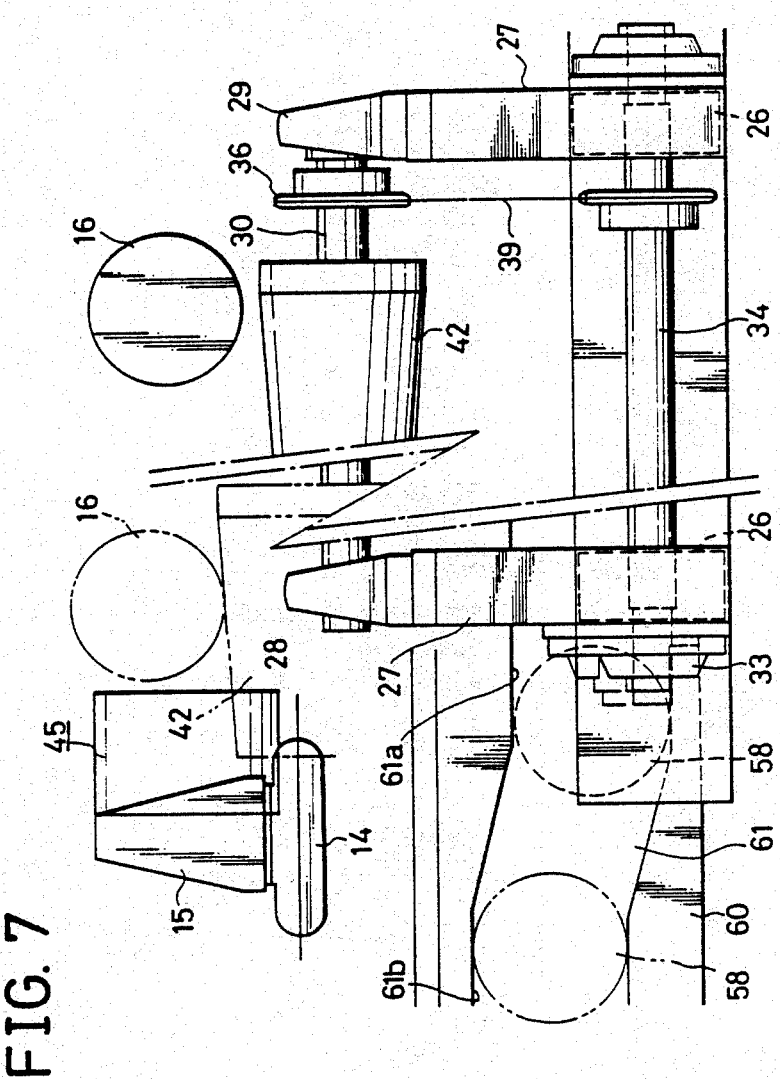
Figure 8:
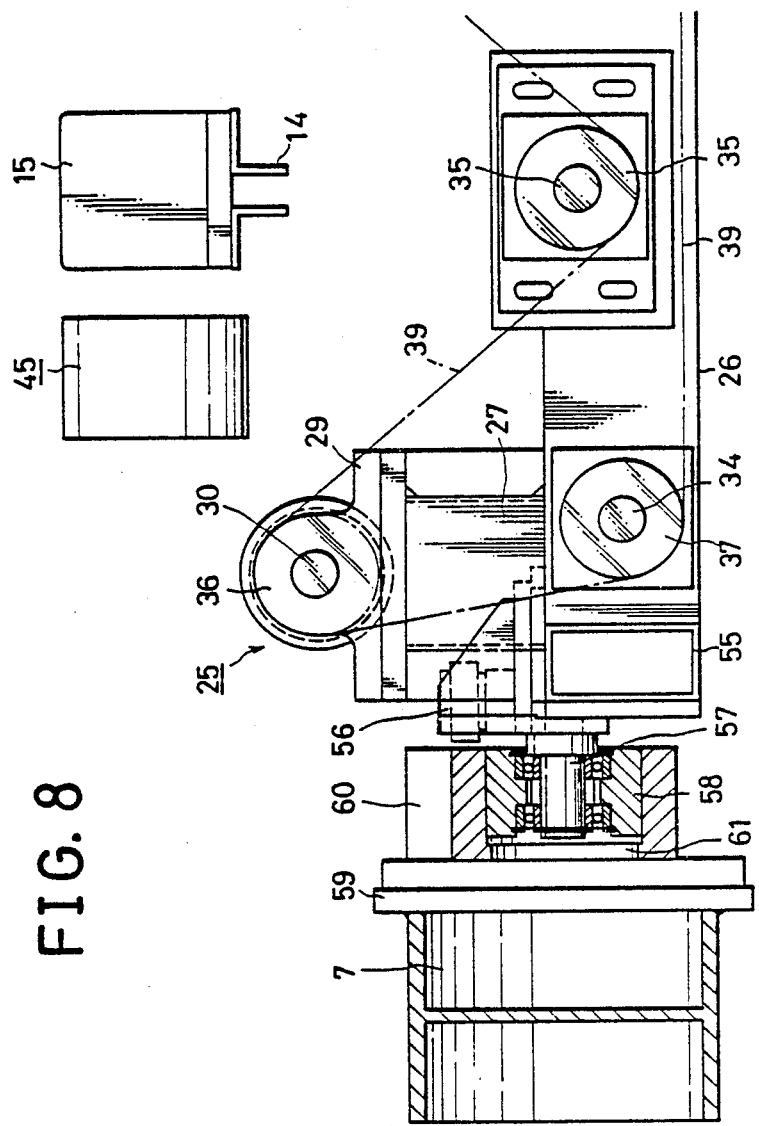
FIG. 8 is a front elevation showing an enlargement of the principal mechanism of the delivery conveyor of the present invention with a sectional view of one section.

Both ends of the movable frame 26, 26 are connected to a plurality of end frames 55, 55, to form a framework, and a fixed shaft 57, as shown in FIG. 8, is provided projectingly on both ends of the end frames 55 through a plate 56. A roller 58 is supported in a freely rotatable manner on the shaft 57. A mounting plate 59 is secured on a side end of the upper side frame 7 close to the roller 58. A cam channel 61 is provided in a cam plate 60 secured to the plate 59, and the roller 58 is housed within the cam channel 61. The cam channel 61, as shown in FIG. 7, runs in the longitudinal direction of the cam plate and is formed in almost a Z shape. Normally, the roller 58 is housed in a low lift channel 61a, but when the machined material 16 is fed, the roller 58 is housed in a high lift channel 61b, making it possible to lift the movable frame 26 and the delivery conveyor 25 on the frame 26.

A cylinder 62 as shown in FIG. 6, is pivotally mounted in a suitable manner at its one end on the upper side frame 8. The tip of the piston rod 63 is secured to the end surface of the movable frame 26 through a connecting fitting 64, and is able to drive the roller 58 along the cam groove 61, following the cam channel 61 by the extension and retraction displacement of a piston rod 63.

Figure 9:
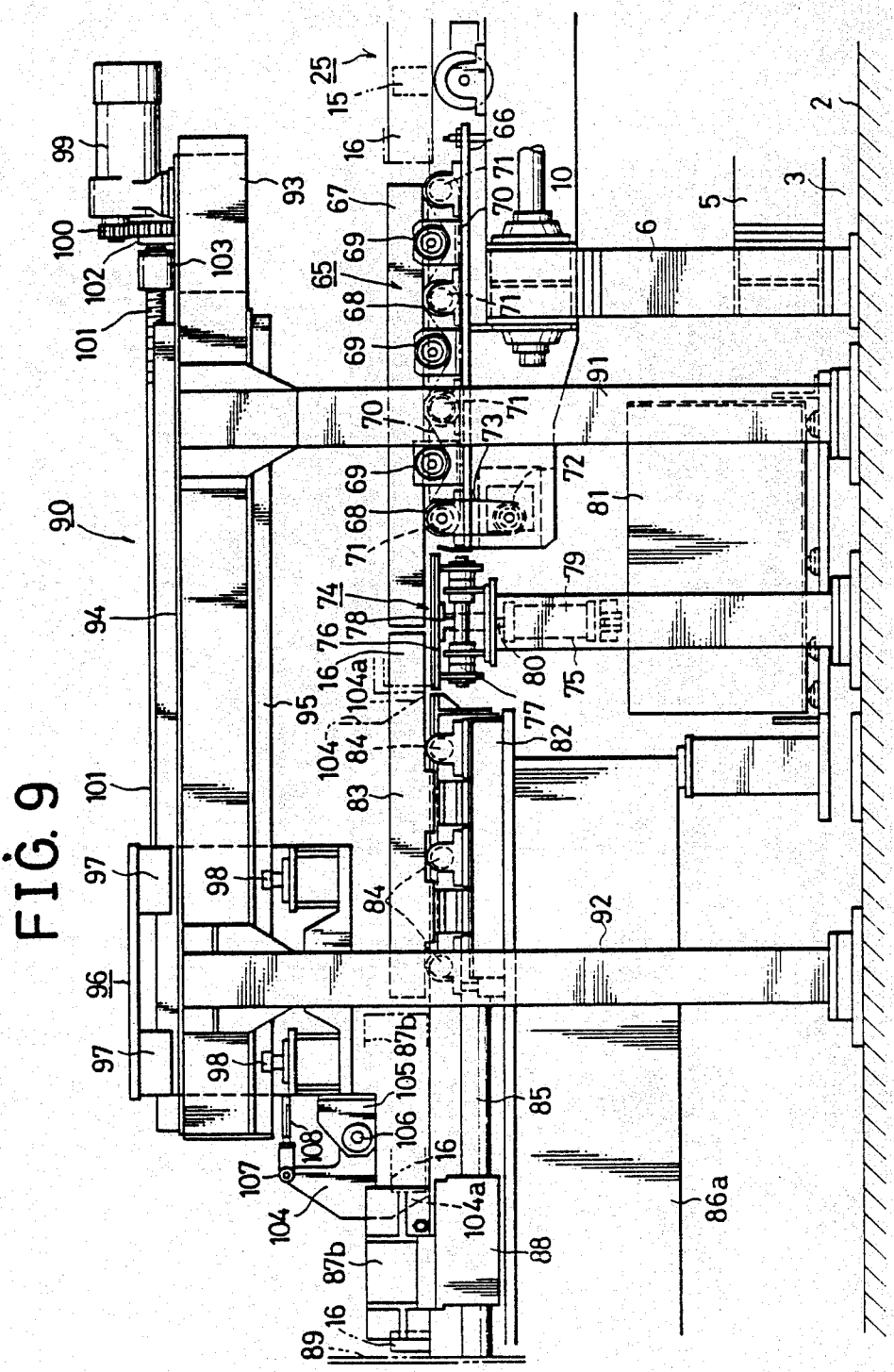
FIG. 9 is a front elevation showing an example of a device for selecting the remnant and a device for collecting the remnant in the present invention.

A chute conveyor 65 as seen in FIGS. 1 and 9 which is installed close to the discharge end of the delivery conveyor 25 and is positioned in the same direction as the transport direction of the conveyor 25, has a chute table 66 constructed in a position at almost the same height of the delivery conveyor 25. A pair of guide plates 67, 67 are opposedly arranged on the table 66 along its longitudinal direction. A plurality of driven sprockets 68 are supported by bearings in a freely rotatable manner on the chute table 66 within the guide plates 67, 67. A chain 70 is able to run in the circumferential direction between the sprockets 68 by way of a tension sprocket 69. A roller 71 is secured on the bearing section of the driven sprocket 68. The machined material 16 is accommodated on the roller 71 and can be transported in the circumferential direction of the chain 70. A drive sprocket 72 is connected to a motor (not shown on the drawings) and a chain 73 runs between the drive sprocket 72 and the driven sprocket 68.

A remnant selection device 74 positioned adjacent to the discharge end of the chute conveyor 65 is provided with a supporting frame 75 erected on the floor surface 2. The base section of a table 76 is mounted in a rotatable manner through a pin 77 on the upper end section of the frame 75. A connecting leaf 78 is secured to the rear surface of the table 76. In addition, an operating cylinder 79 operable in response to a remnant length checking signal is pivotally mounted in the mid to high position of the supporting frame 75, so that it can swing at its base, which will be later described. The connecting leaf 78 is pivotally mounted in a rotatable manner on the tip of the piston rod 80. The cylinder 79 extends the piston rod 80, and horizontally maintains the table 76, which is pivotally mounted at one end thereof to the end of the piston rod 80. In addition, the top surface of the table 76 is positioned at almost the same height as the transport surface of the chute conveyor 65. The piston rod 80 is retracted in response to the abovementioned signal, and one end of the table 76 is rotated in the downward direction, whereby remnants of the machined material 16 below a fixed length on the table 76 are dropped into a remnant collection box 81 for storage.

The signal which checks the length of the remnant in this case is generated from a sensor such as a photoelectric cell matchingly provided between vises, which will later be described, separated a uniform distance from, for example, the machining position, that is the cutting position in this embodiment. The machined material 16 clamped in the vise can detect the length of the remnant by transmission or reflection of the detection light ray between the sensors. In this embodiment of the present invention, in the case where the remnant is less than a set length, the signal from the sensors is transmitted to the cylinder 79, and the inclination of the table 76 is changed to face downward by the retraction of the piston rod 80 so that the transportation of the machined material 16 on the table 76 becomes impossible.

A table 82 is positioned so that it is next to the remnant selection device 74. This table 82 is constructed at almost the same height as the table 66. On the upper surface of the table 82 a pair of guide plates 83, 83, are oppositely positioned in the same way as the guide plates 67. A plurality of rollers 84 is arranged and bearingly supported in a freely rotatable manner between the guide plates 83, 83. A plurality of guide rods 85, 85, are mounted on a machine platform 86a of a machine tool 86, that is the band saw of this embodiment of the present invention. A sleeve 88 integral with a vise 87 is mounted in a slidable manner on each guide rod 85. The vise 87 and the sleeve 88 are constructed so that they can advance or retreat in relation to the direction of a cutter 89 in response to a control signal from the machine tool 86.

Specifically, the vise 87 is linked to the vertical displacement of the cutter 89 and can advance or retreat relative to the direction of a fixed vise, which is later described, to clamp or unclamp the machined material 16. For example, on detecting the descended position of the cutter 89 after completion of the cutting of the machined material 16, the movable vise 87a moves away from the fixed vise 87b, and releases the clamp holding the machined material 16. As will later be described, in the case where both vises are positioned away by the amount of cut section of the machined material 16, they once again approach in the direction of the original position, and clamp the machined material 16. In addition, the movable vise 87a together with the fixed vise 87b can make a uniform reciprocating stroke along the guide rod 85. When the machined material 16 is first fed in, it moves to the position shown by the phantom line in FIG. 9, waiting for the machined material 16 to be fed in, and after the cutting-away of the tip of the machined material 16, both vises move away from the surface of the cut end of the machined material by an amount of cut section. At that specified position the machined material 16 is then clamped and moves in the direction of the cutter 89. It waits for the cut by the cutter 89, and after the cut, in the same way as previously described, the clamp is released and it is moved back by an amount of cut section. Numerical control is frequently used for the ON/OFF control of the clamping of the set of two vises and the control of that movement, as well as the control of the elevation and descent of the cutter 89.

A remnant collection device 90 comprises a chute conveyor 65 and a pair of support frames 91, 92 erected on the front section of the machine tool 86. A support 93 is constructed on the upper end section of the frames 91, 92. A plurality of long guide rails 94, 95 are secured to the top and bottom surfaces of the support 93. A collection carrier 96 is slidably mounted on the rails 94, 95. Specifically, a plurality of slide guides 97, 97 slidably mounted on the guide rail 94 is provided on the top section of the collection carrier 96. A plurality of rotatable rollers 98, 98 are supported in a freely rotatable manner along the outside surface of the guide rail 95 on the lower section of the collection carrier 96. The collection carrier 96 is positioned on the rear end section of the support 93 and is linked to the action of a reversible drive motor 99 so that it can be moved in a reciprocating manner in the longitudinal direction of the support 93.

Specifically, the drive motor 99 is provided on the front end section of the support 93. A gear 102, which is secured to one end of a screw shaft 101, engages a drive gear 100 secured to the drive shaft of the drive motor 99. A male screw is formed over the entire circumferential surface of the screw shaft 101. One end of the screw shaft 101 is rotatably supported by a bearing 103, and the other end is mounted so that it engages the collection carrier 96. The screw shaft 101, the collection carrier 96 and the bearing 103 together form one type of screw mechanism, and the collection carrier 96 is caused to move by the drive action of the drive motor 99. The drive motor 99 is activated after a fixed quantity of the machined materials 16 has been machined, and causes the collection carrier 96 to be moved to the front end section of the support 93. A collection hook 104 mounted on the lower end section of the collection carrier 96 is caused to move to the rear end position of the remnant selection device 74. After moving to that set position the drive is reversed and the collection carrier 96 is returned to its original position.

A projecting leaf 105 projects into the lower end section of the collection carrier 96. The collection hook 104 is pivotally mounted in a freely rotatable manner on the tip of the projecting leaf 105 by a pin 106. The tip of a piston rod 108 of a collection hook control cylinder (not shown on the drawing) installed on the collection carrier 96 is pivotally mounted on the opposite side end of an engaging section 104a of the hook 104. This collection hook control cylinder normally causes the piston rod 108 to retract, and the engaging section 104a of the collection hook 104 is made to stand by at the upper part of the vises 87a, 87b. The front section of the vise 87a moves to the fully extended position shown by the phantom line of FIG. 9, and after releasing the clamping of the machined material 16, the piston rod 108 is extended, and the engaging section 104a is made to drop down to the transport region of the machined material 16.

Figure 10:
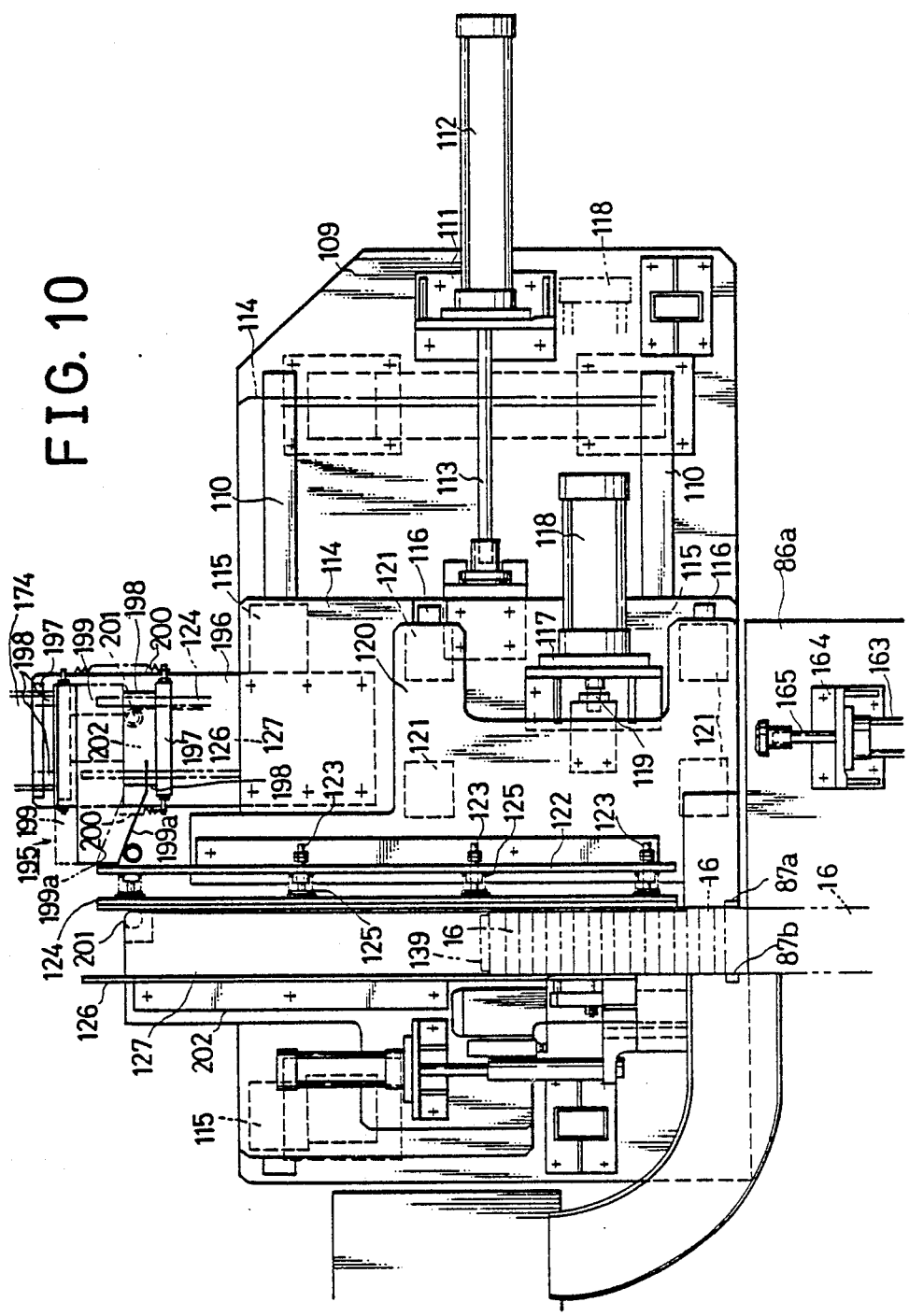
FIG. 10 is a plan view showing an example of the relationship between the prestock passage and storage conveyor bucket, and also the clearance check mechanism of the present invention.
Figure 11:
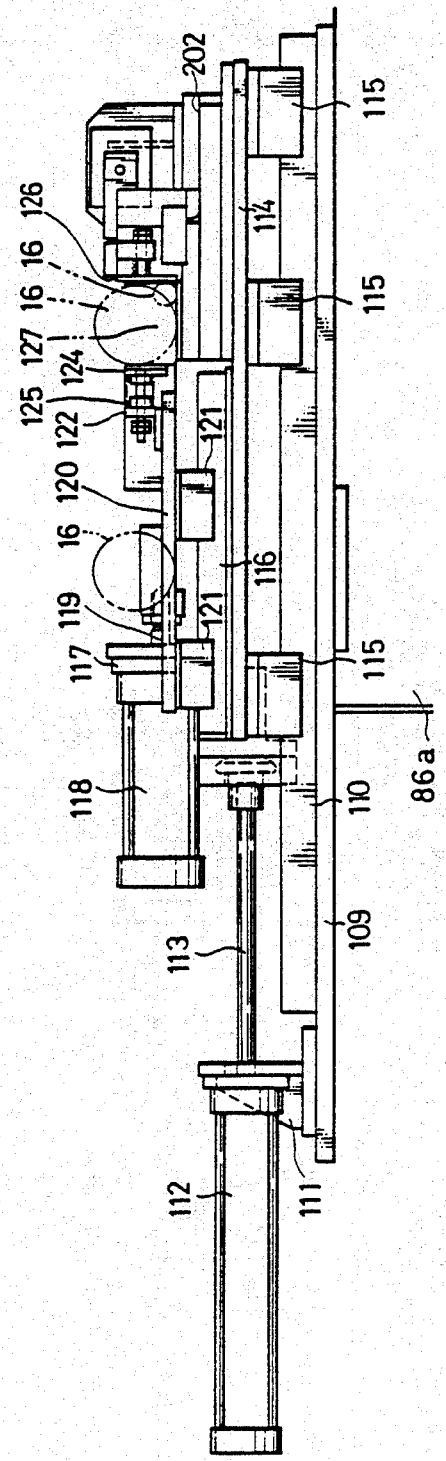
FIG. 11 is the rear view of FIG. 10.
Figure 12:
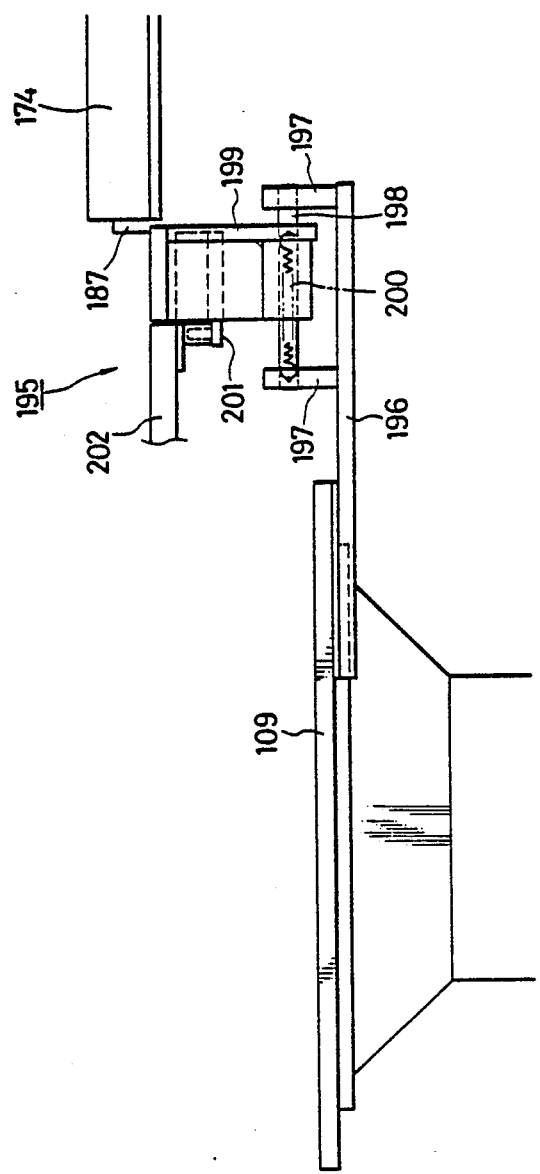
FIG. 12 is the right elevation of FIG. 10 with one part omitted.

In FIG. 10, a pair of guide rails 110, 110 are oppositely positioned in the longitudinal direction of the upper surface of a transverse loading table 109, which is constructed at almost the same height as the upper surface of a machining platform 86a of the machine tool 86. In addition, a power cylinder 112 is secured at one end of the loading table 109 in the longitudinal direction, by a bracket 111, and a movable table 114 is connected to the tip of a piston rod 113. The movable table 114 normally keeps the position shown in FIG. 10. The input port section of a prestock passage, which will later be described, is positioned between the vises 87a, 87b. When a prescribed quantity of the cut machined material 16 is transported into the prestock passage, it moves in the upper right direction of FIG. 10 through the activation of the power cylinder 112, and the prestock passage is moved to a pushout position which will be later described.

Specifically, the movable table 114 has a plurality of slide guides 115 slidably mounted on the guide rails 110, 110 on both sides of its back surface. A pair of guide rails 116, 116 are oppositely positioned on the upper surface of the movable table 114, and a clamp cylinder 118 is mounted at the end section between the guide rails 116, 116 through a bracket 117. A slide plate 120 is connected to a piston rod 119 of the clamp cylinder 118. A plurality of slide guides 121, 121, which are slidably mounted on the guide rails 116, 116, is mounted on the bottom surface of the slide plate 120. The slide plate 120 can advance and retreat in the direction of the prestock passage.

Specifically, the slide plate 120 is usually waiting, separated from the prestock passage. When the clamp cylinder 118 moves, controlled by a movement stroke conforming to the geometrical shape of the machined material 16, it moves in the direction of the prestock passage. A guide plate, which will be later described, is pressed against the outer surface of the machined material 16 for clamping after it has been machined. Each time a machined material 16 is fed into the prestock passage when the machining takes place, the slide plate advances or retires synchronously with the clamp cylinder 118 to open the one side of the prestock passage, and to perform the amplitude movement which expedites the feeding in of the machined material 16.

A fixed fitting 122 comprises a member with an L-shaped cross section secured to the end of the slide plate 120. A guide plate 124 is mounted in a position close to the fitting 122 through a connecting rod 123, and a spring 125 is inserted between them. The guide plate 124 is normally energized in the direction of the prestock passage by the spring 125. A long guide plate 126 is erected on the table 114 and is positioned in opposition to the guide plate 124. The guide plate 126 together with the guide plate 124 faces on one end of the rear end section of the vise 87a, 87b and together they form a long, screen-shaped prestock passage 127.

Figure 13:
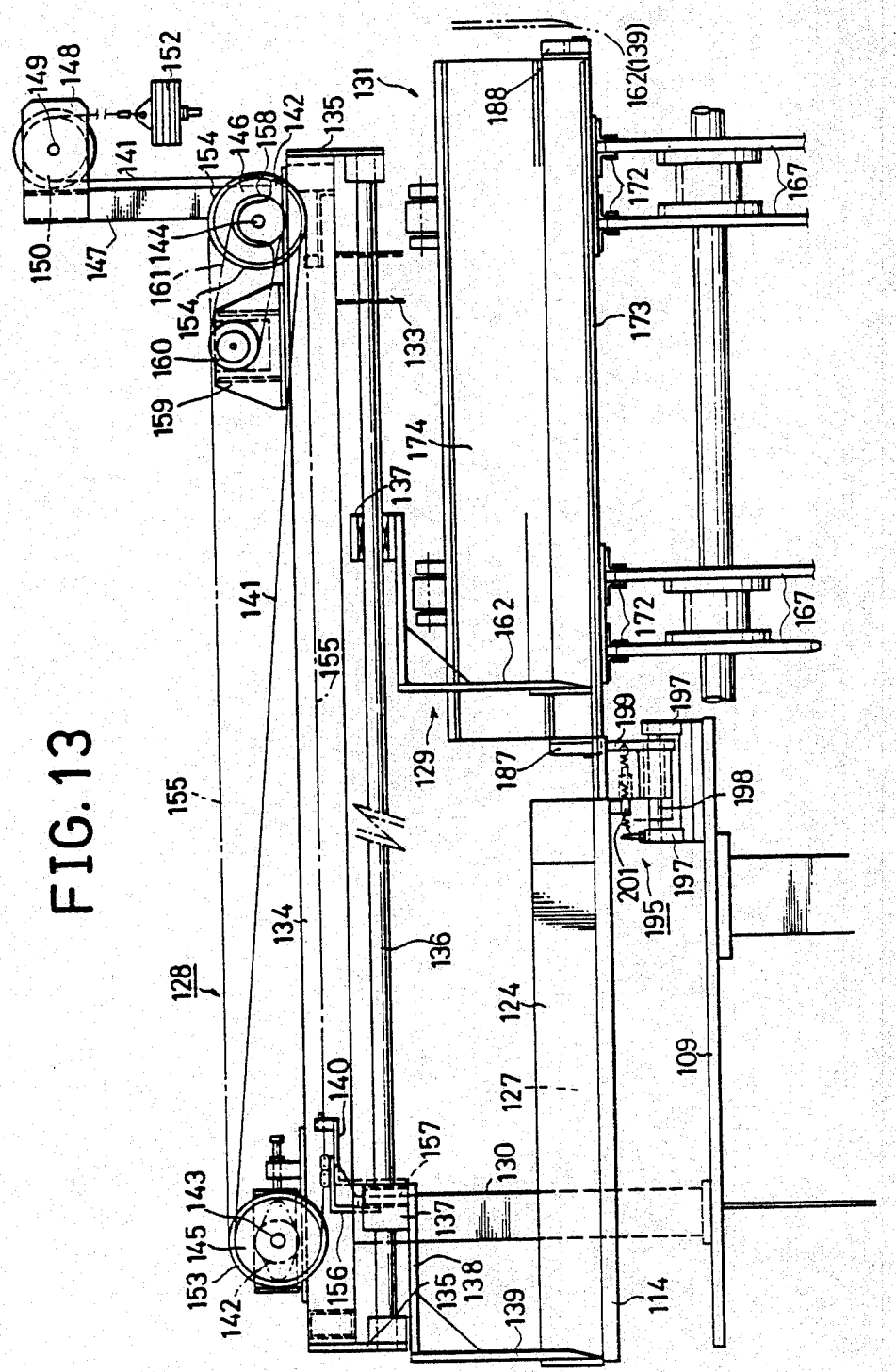
FIG. 13 is a front elevation showing an example of the relationship between the checkdown mechanism and clearance check mechanism, and also the relationship between the prestock aisle and the storage conveyor of the present invention.

The prestock passage 127 has a passage length which can accommodate the specified quantity of the machined materials 16 cut into almost a plate shape as previously described, and the width of the passage can be suitably adjusted by means of the clamp cylinder 118. When the machined material 16 is cut, the passage is set at a first position located at the rear of the vise 87a, 87b. A fixed quantity of the machined materials 16 is accommodated in the prestock passage 127, and when a push-out process occurs, by which the machined materials 16 are fed to a storage conveyor, which will be later described, the pasage is set at a second position, in front of the buckets of the storage conveyor. A first checkdown mechanism 128 and a second checkdown mechanism 129 are mounted at each position as shown in FIG. 13 to prevent the rolling of the machined materials 16 stored in the prestock passage 127.

Figure 14:
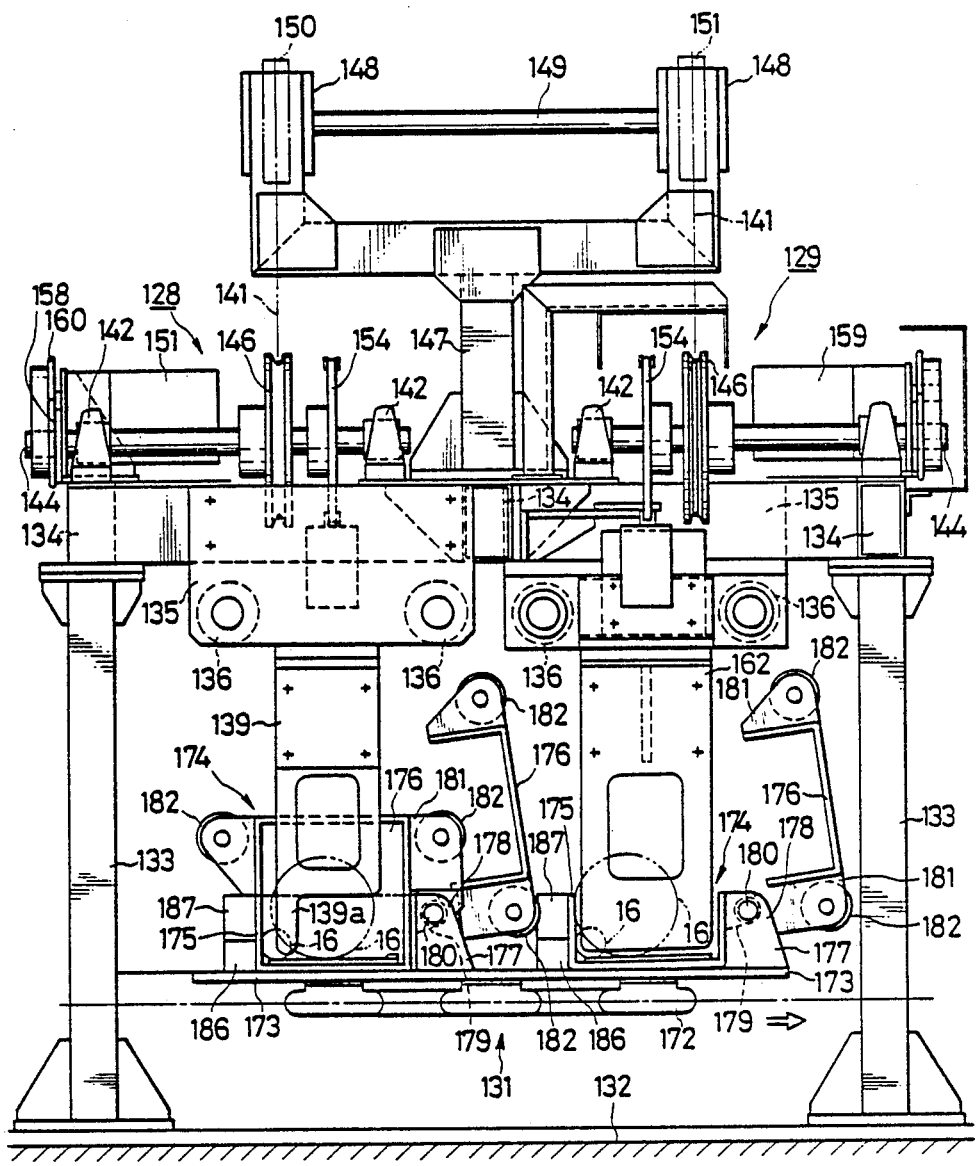
FIG. 14 is a front elevation showing an example of the relationship between the checkdown mechanism and the storage conveyor of the present invention.

The first checkdown mechanism 128 comprises a support frame 130 erected on the loading table 109 and a bridging frame 134 constructed between the upper ends of a support frame 133 erected on a side frame 132 of a storage conveyor 131. A pair of guide rods 136, 136 are provided between the two ends of the bridging frame 134 through a plurality of brackets 135, 135. A plurality of sliders 137, 137 are slidably mounted on the guide rods 136, 136. A first push plate 139 is secured to one end of a support leaf 138 which is attached to the bottom surface of the sliders 137, 137. The first push plate 139 is formed from a longitudinal plate which can pass in and out of the prestock passage 127. An engaging projecting leaf 139a is formed by removal of the better part of the lower end of the first push plate 139, as shown in FIG. 14. This engaging projecting leaf 139a is positioned on the side of the. fixed vise 87b, and compensates for the change in the engaging action resulting from, the size of the geometrical form of the machined material 16.

An L-shaped coupling 140 is attached to the end of the sliders 137, 137, and one end of a rope 141 is attached to the end of the L-shaped coupling 140. First push plate 139 is always energized in the direction of the inlet to the prestock passage 127 by the tension activated in the rope 141. Specifically, a rotating shaft 143 and a rotating shaft 144 are rotatably supported on the front and back ends of the bridging frame 134 respectively, and a pulley 145 and a pulley 146 are supported in a freely rotatable manner on the shafts 143 and 144 respectively. In addition, a high pedestal frame 147 is erected on the rear end of the bridging frame 134. A pulley shaft 149 is attached between a plurality of tension leaves 148, 148 which are mutually separated and arranged on the upper end of the high pedestal frame 147. A plurality of pulleys 150, 151 are supported in a freely rotatable manner on the shaft 149. Then, the rope 141 runs among the pulleys 145, 146, 150, as shown in FIG. 13, and a weight 152 is installed on the end of the rope 141 which hangs downward from the upper circumferential surface of the pulley 150. The tension created by this weight acts on the rope 141 and energizes the first push plate 139 in the forward direction.

In addition, a sprocket 153 and a sprocket 154 are attached to the rotating shafts 143 and 144 respectively, and a chain 155 runs between the sprockets 153, 154. One end of an engaging arm 156 is connected to the chain 155, and its other end can engage a connecting frame 157 which connects the sliders 137, 137. A sprocket 158 is attached to the end of the rotating shaft 144. A chain 161 runs between the sprocket 158 and a drive sprocket 160 which is directly connected to the drive shaft of a motor 159 installed on the side of the rear end of the bridging frame 134. Power is transmitted to the sprocket 154 from the rotating shaft 144, and causes the chain 155 to run, thus moving the engaging arm 156.

The second checkdown mechanism 129 is installed on the top of the prestock passage 127, which moves in front of the bucket standby position of the storage conveyor 131, and has a second push plate 162 which can move along the inside of the prestock passage 127. The push plate 162 lightly presses the end surface of the last section of the machined material 16 at the time when several machined materials 16 stored in the prestock passage 127 are pushed out into a waiting bucket, and also prevents the machined material 16 from rolling when this push out occurs. The second push plate 162 is constructed as a longitudinally extended plate which is a little wider than the first push plate 139, as shown in FIG. 14. It is always energized in the forward direction and can engage with the end surface of the machined material 16. When the push out occurs, it moves together with the machined material 16, moving in the direction of the storage conveyor 131, and afterward it can withdraw from the operating area of the conveyor 131.

The mechanism which energizes the second push plate 162 in the forward direction works on a method using the pulleys 145, 146 and the rope 141 and weight 152. The means for withdrawing from the circumferential region of the storage conveyor and the means of moving in the direction of the prestock passage 127 are similar to the previously described method, using the sprockets 153, 154, 158, 160 and the chain 155 and the motor 159. The specific construction is substantially the same as that for the first checkdown mechanism 128, and the same names and reference numbers are employed. Further explanation is therefore omitted here.

The first and second push plates 139, 162 are usually withdrawn from the rear end of the storage conveyor 131, and standing by. When the cutting of the machined material 16 takes place, the first push plate 139 and the connector 140 move integrally in the direction of the prestock passage 127, activated by the motor 159. The construction is such that the checkdown action becomes possible, and, prior to the push-out action, the first push plate 139 moves to the original position through the action of the motor 159. In addition, the second push plate 162, prior to the push-out action, moves in the direction of the prestock passage 127 through the action of the motor 159. The checkdown action becomes possible, and, after the push-out action, the first push plate 139 moves to the original position through the action of the motor 159.

A push-out cylinder 163 is provided on the machine platform 86a of the machine tool 86 through a bracket 164. A piston rod 165 of the push-out cylinder 163 is arranged facing the exit of the prestock passage 127 when the push-out process occurs, and the push-out stroke is almost the same length as the prestock passage 127. The piston rod 165 is usually retracted and withdrawn from the movement area of the prestock passage 127. When the prestock passage 127 has moved to the prescribed position during the push-out process, the piston rod 165 extends, linked to the action of the push-out cylinder 163, and its tip section contacts the end surface of the furthest forward machined material 16 stored in the prestock passage 127. It pushes the machined material 16 to the rear, and after the push-out process is completed it retracts and returns to the original position.

The storage conveyor 131 is provided adjacent to the loading table 109. Its conveying direction is transverse to the passage direction of the prestock passage 127. The storage conveyor 131 is conveniently explained with reference to one part of FIG. 17 in conjunction with FIG. 14. A plurality of conveyor frames 132, 132 is mounted on the upper end of a supporting frame 166 erected on the floor surface 2. A pair of drive sprockets 167 and a pair of driven sprockets 168 are rotatably supported at either end of the conveyor frames 132, 132. A chain 171 runs between one of the drive sprockets 167 and a sprocket 170 directly connected to the drive shaft of an intermittently driven motor 169 so that the power from the motor is transmitted to the drive sprocket 167. A pair of chains 172, 172 run between the drive sprockets 167 and the driven sprockets 168. A plurality of bucket bases 173 are constructed to extend between the chains 172, 172, and a bucket 174 is attached on these bucket bases 173.

The bucket 174 comprises a bucket lower frame 175 attached to the bucket base 173, and a bucket upper frame 176 which opens and closes an aperture section on the bucket lower frame 175. The bucket lower frame 175, as shown in FIG. 14, is constructed as a long member with a U-shaped cross-section area. In the center of one of its vertical walls, a pair of projecting leaves 177, 177 are projectingly provided. The bucket upper frame 176 is pivotally and rotatably mounted on the projecting leaves 177, 177. The bucket upper frame 176 is constructed in the same form of long member as the bucket lower frame 175. A projecting hinge 178 is projectingly mounted at the center of its vertical wall, and a pin 180 is inserted through a torsion spring 179 between the projecting hinge 178 and the projecting leaves 177, 177, connecting the bucket upper frame 176 in a pivotally supported manner to the bucket lower frame 175 so that the aperture section of the bucket lower frame 175 is normally held open through the torsion spring 179.

Figure 17:
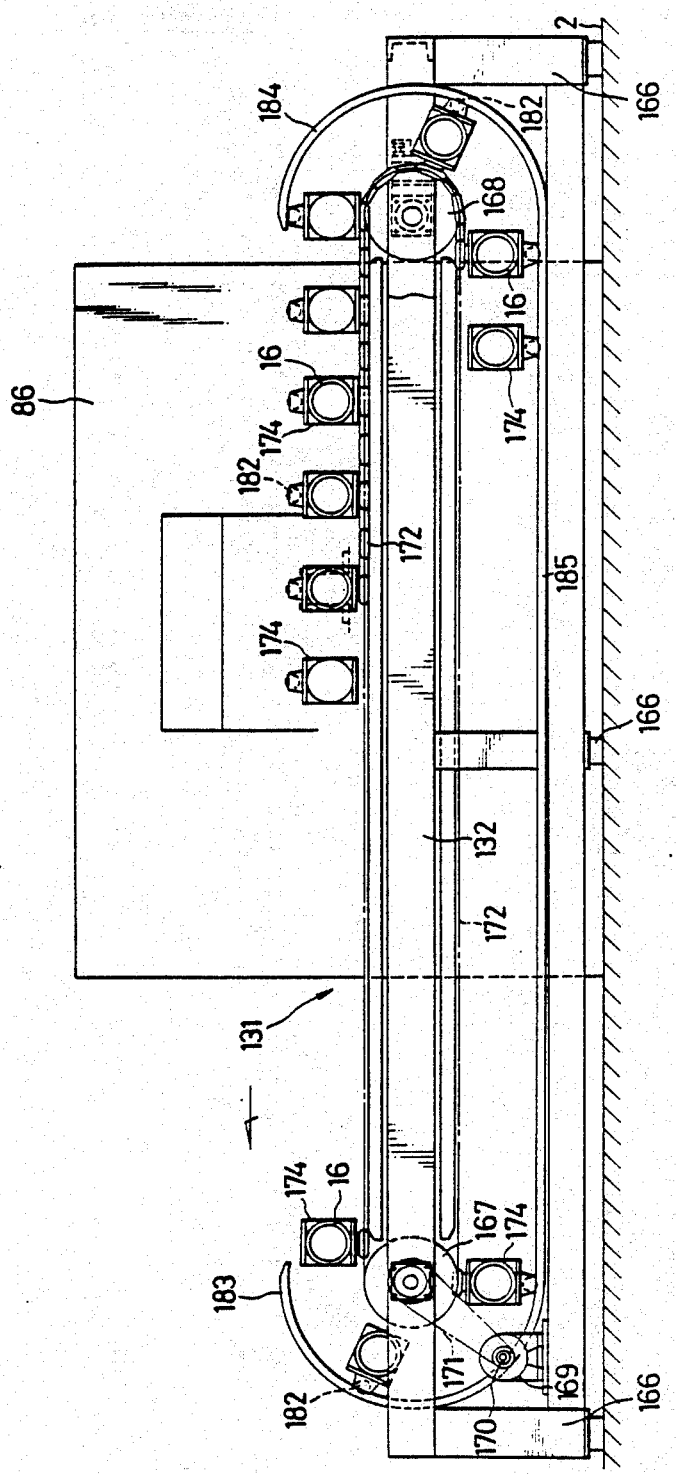

A plurality of roller supports 181, 181 are provided in the form of plates which are projectingly mounted in pairs at the center of each of the vertical walls of the bucket upper frame 176. A plurality of rollers 182, 182 are bearingly supported in a freely rotatable manner between the supports 181, 181, and can rotate on a guide rail which will be later described. Specifically, a plurality of semicircular guide rails 183, 184 are provided within the circumferential region of the chain 172 which runs between the sprockets 167, 168 of the storage conveyor 131, on the outside of both the sprockets 167, 168 so that the guide rails 183, 184 face onto the rotating area of the roller 182 as shown in FIG. 17. In addition, a straight guide rail 185 is provided facing onto the moving area of the roller 182 on the lower circumferential region of the chain 172. Both ends of the guide rail 185 are connected to the guide rails 183, 184. When the bucket 174 moves on the guide rails 183, 184, 185 through the rollers 182, the angle of rotation of the bucket upper frame 176 is regulated through the rollers 182, and acts to open and close the aperture section of the bucket lower frame 175.

In the case, for example, when the circumferential direction of the chain 172 is the direction indicated by the arrow in FIG. 17, the bucket 174 rotates in the downward direction at the guide rail 183 and its lid closes. Then the bucket 174 rotates upward at the guide rail 184 and the cover opens. The bucket 174 is covered from the beginning to end of its travel along the guide rail 185, preventing the contained machined materials 16 from falling out, and when the bucket 174 is above the chain 172 its cover is open so that it is possible to transfer the machined materials 16 from the prestock passage 127 to the bucket 174.

A square hinge 186 is attached to both ends of the vertical walls of the bucket lower frame 175, and a plurality of side covers 187, 188 (See FIG. 10) is pivotally and rotatably mounted on the outer end surfaces of the hinges 186, 186. The mechanism of these side covers is essentially the same, so for convenience the explanation will be made with reference to the upper side cover 188 only. The side cover 188 is constructed as a transversely extended plate which is slightly wider than the width of the bucket lower frame 175. A bushing 189 is mounted at a corner angle of the side cover 188, which is pivotally connected by a pin 190 penetrating a square hinge 186 from the outside of the bushing 189. A torsion spring 191 is inserted between the side cover 188 and the square hinge 186, and the aperture section of the bucket lower frame 175 on its rear side is normally kept closed by the spring 191.

Figure 15:
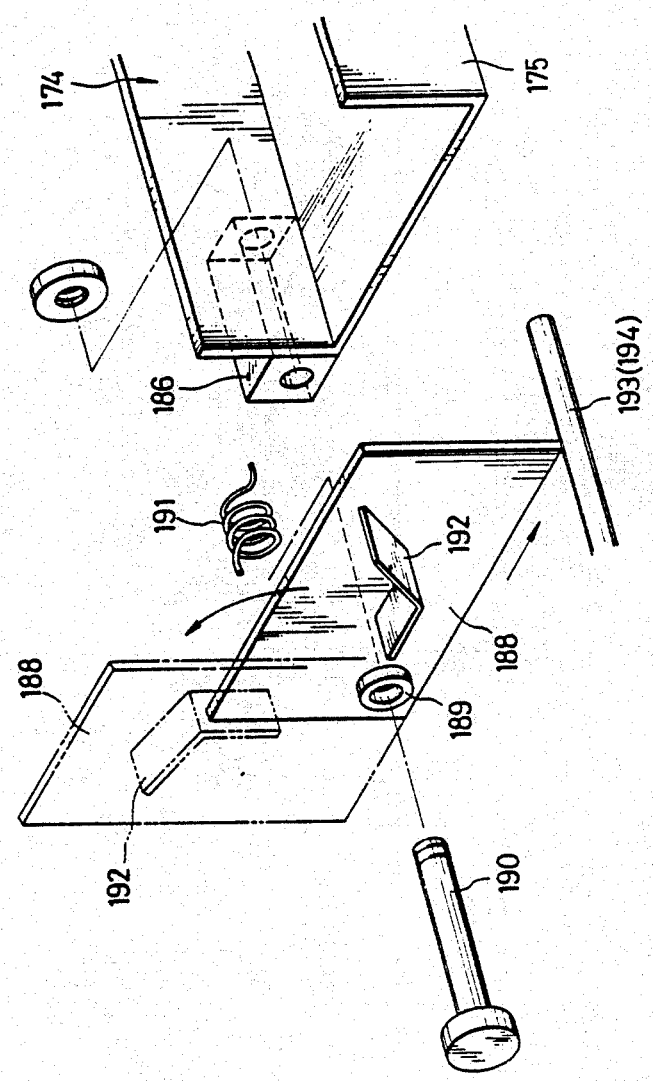
FIG. 15 is an assembly drawing view showing an example of the bucket side cover opening and closing mechanism of the present invention.

A wide-mounted V-shaped engaging leaf 192 in FIG. 15, is attached to the outer surface of the side cover 188. A plurality of engaging pins 193, 194 contact the engaging leaf 192, and cause the side cover 188 to rotate vertically so that the side aperture section of the bucket lower frame 175 can be opened. Specifically, at a position adjacent to the first and second positions of the prestock passage 127, or more specifically, at a position in front of these positions in the conveying direction of the storage conveyor, each pair of engaging pins 193, 194, of which one end is attached to the conveyor frame 132 corresponding to each position, are projectingly positioned facing the moving region of the engaging leaf 192. When the bucket 174 is moved before each position, the engaging leaf 192 is caused to contact the engaging pins 193, 194, and the side cover 188 is rotated to the open position. The side cover 188 is fully opened at a location directly in front of each position, and the engagement of the engagement leaf 192 and the engagement pins 193, 194 is released after it has passed the position, so that the side cover 188 is rotated to the closed position. Accordingly, the side cover 188 is rotated to the open setting by the engaging pin 193 which is located at the first position, and rotated to the closed setting after it has passed the position. The side cover 188 is once again opened by the engaging pin 194 which is located at the second position, and is closed after it has passed the position.

In FIG. 13, a clearance check mechanism 195 is positioned between the loading table 109 and the bucket 174, facing onto the final section of the push-out stroke by the push-out cylinder 163. The clearance check mechanism 195 comprises a projection table 196 (See FIG. 10) projectingly mounted on the rear section of the loading table 109. A pair of supporting leaves 197, 197 are opposedly positioned at the front and rear of the table 196. A pair of guide bars 198, 198 are provided between the supporting leaves 197, 197. The base of a movable stand 199 is slidingly mounted on the guide bars 198, 198, and a spring 200 is stretched between the lower end of the movable stand 199 and one of the supporting leaves 197 so that the movable stand 199 is always energized in the forward direction so that the rear end surface of the movable stand 199 is withdrawn from the circumferential region of the bucket 174.

The upper surface of the movable stand 199 is provided at the same height as the storage surface of the bucket lower frame 175. A straight tapered surface 199a is formed on one side of the front section of the movable stand 199. A roller 201 is contactingly mounted on the tapered surface 199a. The roller 201 is bearingly supported in a freely rotatable manner on the rear section of a pedstal 202 which is attached to the side end section of the movable table 114. When the push-out action occurs, the roller 201 moves integrally with the pedestal 202 and engages the tapered surface 199a, so that the movable stand 199 is moved toward the bucket 174 to reduce the space between them.

In addition, in this embodiment of the present invention the attachment 15 is connected to the chains 13 on the feed conveyor 1, and the machined material 16 is housed between two of the attachments 15, 15. However, in place of the attachment 15 the following configuration, for example, is acceptable. A long bucket, the same as the bucket 174 which is connected to the chain 172 of the storage conveyor 131, is connected to the chain 13. The bucket upper frame is caused to close at the circumferential region of the lower side of the chain 13 and at the rotating area of both sides. This prevents the machined materials 16 stored in the bucket from dropping out, and at this time a pair of rollers provided on the bucket upper frame are caused to roll along the guide rail 18 and the guide surfaces 23, 24 of the buckets 21, 22. This configuration serves to reduce the load on the upper side of the chain 13 and provide for smooth movement in the circumferential direction, as well as causing the bucket upper frame lid to open at the upper side circumferential region of the chain 13, making possible the transfer of the machined material 16.

Figure 16:
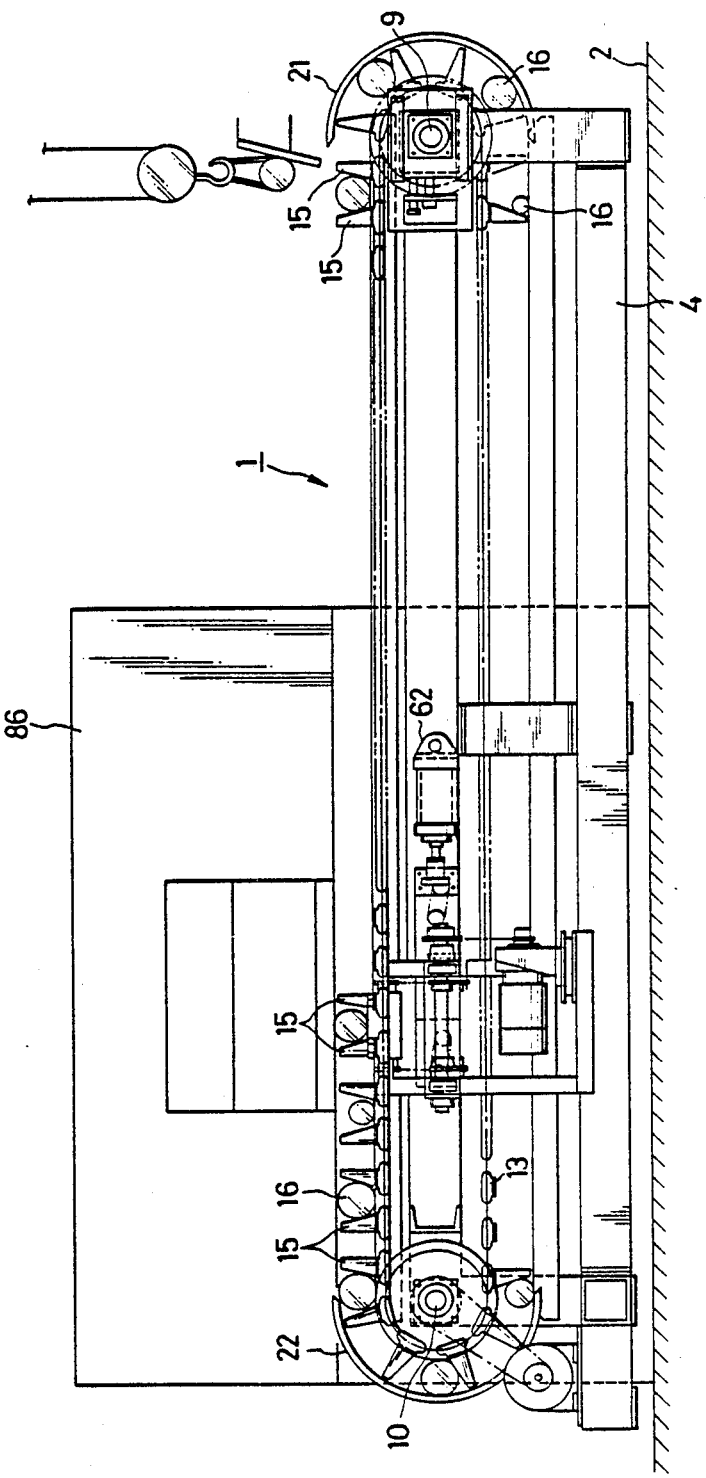
FIG. 16 and FIG. 17 are front elevations showing another embodiment of the present invention.

Another embodiment of the present invention is shown in FIG. 16 and FIG. 17. The same identifying numbers are used for the parts which correspond to the parts in the previous embodiment described. In this embodiment, the bucket 174, which is mounted on the storage conveyor 131, is constructed in the form of a long tube. It is characterized by the omission of the lid-opening mechanism and a reduction in the number of parts which simplifies the construction.

OPERATION

The utilization of the system of this configuration in feeding the machined material to the machine tool and storing after machining will now be explained after which operation of the invention in accordance with the first embodiment will be described in detail. First, machined materials of a long piece of material are loaded between a pair of attachments 15, 15 on the feed conveyor 1, using an appropriate means such as a chain block or crane. The machined materials 16 of different geometrical forms, specifically inner and outer diameter, material length, cross-sectional shape, hollow or solid, and of different quality, are used. These are loaded on one or more feed conveyors 1. However, similar machined materials 16 must be accommodated in one piece between the attachments 15, 15. The prescribed amount of the prescribed machined material 16 is loaded onto the feed conveyor 1, and the motor (not shown in the drawings) is started. A plurality of sprockets 11, 12 which are attached to the same shafts 9, 10, are caused to rotate in the same direction and at the same speed by the chains 13 which run between them and move in the same direction and at the same circumferential velocity. Accordingly, the circumferential movement of the machined material 16 in FIG. 1 is perpendicular to the surface of the drawing. At this time, because it rolls or slides on the guide rail 17 attached to the top of the upper side frame 8 at the upper side circumferential region of the chain 13, the weight of the machined material 16 does not act directly on the chain 13 and the load on the chain 13 is substantially reduced. In the same way, on the lower circumferential region of the chain 13, the machined material 16 moves on the guide rail 18 attached to the top of the lower side frame 5 and the load on the drive motor and/or the chain 13 is reduced.

In the rotating regions at both ends of the circumferential region of the chain 13, the machined materials 16 follow the circumferential surface of the ring guides 19, 20 which are integrally mounted on the sprockets 11, 12. The machined materials 16 run onto the separated attachments 15, 15 and stop, then begin to rotate. In addition, they are prevented from falling out by the semicircular guide surface 23, 24 on the brackets 21, 22 which are positioned on the outside of the ring guides 19, 20, so that the movement of the upper and lower sides at the circumferential region is carried out smoothly. In this case, if concave openings capable of accommodating the machined materials 16 are formed on the circumferential surfaces of the ring guides 19, 20 corresponding to the pitch of the attachments 15, 15 the machined material 16 is positively secured, and its movement and rolling is reliably prevented.

Figure 3:
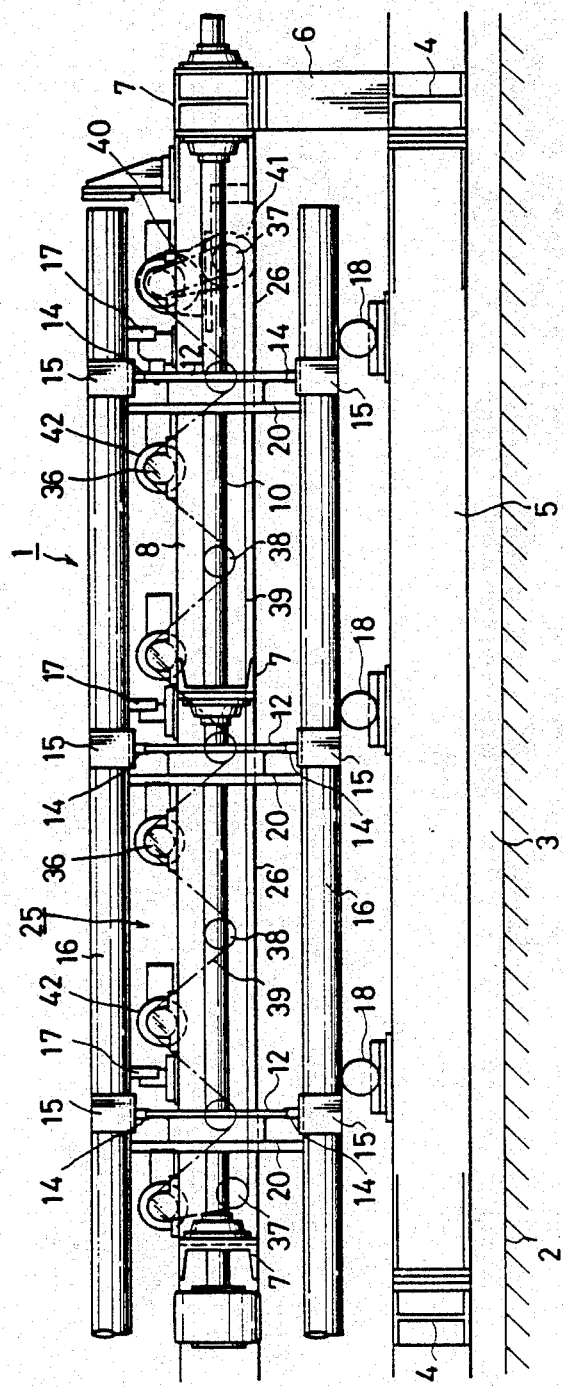
FIG. 3 is a front elevation showing an example of a delivery conveyor of the present invention.

In the circumferential motion of this type of feed conveyor 1, the driving of the delivery conveyor 25 integrally mounted on the conveyor 1 is halted, and in addition, the action of the cylinder 62 for elevating the movable frame 26, and of the cylinder for retracting the worm 51 and tie-rod 53 is also halted, and the piston rod 63 is caused to retract. Accordingly, the roller 42 positioned between the chains 13, as shown in FIG. 3, withdraws downward from the circumferential region of the machined material 16. In addition, the guide roller 45 mounted on the same shaft as the roller 42, as shown by the solid line in FIG. 4, fall into the horizontal plane and are withdrawn in the downward direction of the circumferential region of the machined material 16 so that no damage occurs from the circumferential motion of the conveyor 1.

Next, in the case where a specific machined material 16, which is loaded on the feed conveyor 1, is fed to the machine tool 86, this machined material 16 moves onto the delivery conveyor 25, the drive of the feed conveyor 1 halts, and the cylinder (not shown in the drawings) for retracting the worm 51 and tie-rod 53 is activated. Its piston rod is extended and the worm 51 and tie-rod 53 are displaced in their axial direction. When the worm 51 is displaced in this manner, the gear 50 which engages the worm 51 rotates by a fixed angle, and the guide roller 45, which is integrally constructed with the gear 50, moves in unison with the gear 50, and, as shown by the phantom line in FIG. 4, stands upright at a position adjacent to the machined material 16. After this, the previously-mentioned cylinder continues to maintain the displacement of the piston rod so that the guide roller 45 continues to maintain its upright position.

Before and after the activation of this cylinder takes place, the cylinder 62 for elevating the movable frame 26 is also activated. The roller 58, which is bearingly supported in a freely rotatable manner through the side frame 55 which is connected to the tip of the piston rod 63, is moved from the lower lift channel 61a in the cam channel 61, as shown in FIG. 7, to the higher lift channel 61b. The movable frame 26, which is integral with the axis of the roller 58, is lifted by the lifting amount of the cam channel 61b. Accordingly, the plurality of roller shafts 30, which are integrally constructed on the movable frame 26, are also lifted in the same way, and the roller 42, which is attached to the shaft 30, is lifted from the position shown by the solid line in FIG. 7 to the position indicated by the phantom line. At that time, the machined material 16 being supported by the guide rail 7 is accommodated on the circumferential surface of the roller 42.

When the machined material 16 transferred onto the circumferential surface of the roller 42 is a unit with an unstable round cross-section, it moves along the tapered surface of the roller 42 as shown in FIG. 5, and contacts the guide roller 45, which is standing on its small diameter side circumferential surface. This prevents the machined material 16 from falling out, and any movement such as lateral movement or rolling is prevented as a result of the wedge effect. Also, when components with other cross-sectional forms are transferred to the circumferential surface of the roller 42, they slide down along the tapered surface and are accommodated in almost the same manner as outlined above.

When the motor 40 is driven under this type of condition, its power is transferred through the drive sprocket 41 and the chain 39 to the sprockets 36, 37, 38. The power is further transferred to rotate the rollers 42 in the same direction and at the same rotational velocity, each of which is attached to each roller shaft 30 rotating with the sprocket 36. The machined material 16 on the roller 42 is fed in the direction of the chute conveyor 65. At that time, the machined material 16 is caused to move along and stop at the guide roller 45 so that the path of its movement is uniform and stable. It is, therefore, accurately and reliably positioned at the feed of the chute conveyor 65. The drive of the motor 40 then is stopped and the rotation of the roller 42 is stopped. The piston rods of each of the two cylinders are maintained in the extended position, and the lift of the movable frame 26 is continued, to await the action of handling the remnant, which action will be later described.

The chute conveyor 65 is driven just before and after the start of the delivery conveyor 25, and the power is transmitted to rotate the roller 71 which is on the same shaft as the sprocket 68, in the same direction and at the same rotational velocity. The machined material 16 which is transferred from the delivery conveyor 25 is accommodated on the roller 71, which moves the material 16 toward the remnant selection device 74. When it passes through the chute conveyor 65, the machined material 16 moves between the guide rails 67, 67 so that it is prevented from falling from the chute conveyor 65.

The remnant selection device 74 is normally halted, and the piston rod 80 of the piston 79 is extended. The table 76 connected to the tip of the rod 80 is maintained level at about the same height as the conveying region of the machined material 16. Accordingly, the machined material 16 fed from the chute conveyor 65 is prevented from falling by the adjacent guide plates 67, 83 while being moved on the table 76, and is fed to the roller 84 on the adjacent table 82. The machined material 16 continues moving in the same direction, and its tip enters between the vises 87a, 87b waiting on the machine platform 86a. When it has reached this set position its movement halts.

The vises 87a, 87b are positioned at the front end section of the machine platform 86a when the machined material 16 starts feeding in. Once the machined material 16 has been fed between the jaws, the vises 87a, 87b, clamp the material 16 to hold it and move to a set position at the rear end section of the machine platform 86a and waits for the machining of the machined material 16. After the vises 87a, 87b have moved to this set position, the cutter 89 of the machine tool 86 descends and cuts off the tip of the machined material 16, which is the so called discard cutting. On the completion of the discard cutting, the vises 87a, 87b are released, the cut surface of the machined material 16 is moved ahead by the amount of the length to be cut, and the material 16 is once again clamped by the vises 87a, 87b. With the machined material 16 projecting in the rear direction by the amount of the length to be cut, the vises 87a, 87b move again to the set position at the rear end section of the machine platform 86a and waits for machining by the cutter 89.

The machined material 16 which has been cut to the prescribed length by the cutter 89 is pushed by the rear surface of the machined material 16 being fed into the jaws of the vises 87a, 87b. The machined materials 16 are thus fed in sequence into the prestock passage 127 on the table 114, and both side surfaces are clamped and supported by the guide plates 124, 126 which form the prestock passage 127. The width of the prestock passage 127 is adjusted prior to the feeding in of the machined materials 16. That adjustment is made to suit the geometrical form of the machined material 16, especially the outer diameter or the opposite side dimension, and is performed by controlling the extension displacement of the piston rod 119 of the clamp cylinder 118.

This is set according to a signal from, for example, a sensor which detects the geometrical form of the machined material 16 held in the vises 87a, 87b. After the adjustment of the stroke of the clamping cylinder 118, the piston rod 119 is extended by the amount of the stroke and causes the equivalent movement in the guide plate 124 on the slide plate 120. The passage width is formed between the adjusted guide plate 124 and the other guide plate 126.

The guide plate 124 is maintained in the adjusted position when the machined material 16 is cut. It applies pressure to the side surface of the machined material 16 accommodated in the prestock passage 127 through the restoring force of the spring 125 mounted on its rear surface.

The machined material 16 is once again clamped between the vises 87a, 87b. At the same time, when the machined material 16 which has just been cut is about to be fed into the prestock passage 127, the guide plate 124, linked to the uniform retraction displacement of the piston rod 119, is separated from the guide plate 126, whereby the width of the prestock passage 127 specifically expands the feed route to the prestock passage 127 of the machined material 16 which has just been cut. Accordingly, the feeding of the machined material 16 is easily handled, and once the machined material 16 has been fed to the prestock passage 127, the stroke of the piston rod 119 is restored to its original state. The guide plate 124 is then returned to its original position where the guide plate 124 and the guide plate 126 together clamp and support the machined material 16 by both side surfaces. After this, the guide plate 124 synchronously feeds the machined material 16, and the action cycle just described is repeated.

Even when the guide plate 124 is pulled back and the machined material 16 is unclamped momentarily as outlined above, the machined material 16 is prevented from rolling by the functioning of the first checkdown mechanism 128. Specifically, the first push plate 139 which forms part of the first checkdown mechanism 128 is usually withdrawn from the rear end section of the storage conveyor 131, as shown in FIG. 13, awaiting action. That action begins as the result of a signal from the previously described sensor which counts the combined number of the machined materials 16 which have been machined and senses the remaining quantity of the machined material 16 clamped in the vises 87a, 87b and its position. For example, the machined material 16 is fed into the vises 87a, 87b, and the sensor senses this fact and outputs a signal to the motor 159, which causes the motor 159 to start. Its power is transmitted through the sprocket 160 and the chain 161 to the rotating shaft 144 which bearingly supports the sprocket 158. This power is also transmitted to the sprocket 153 through the sprocket 154, which is attached to the shaft 144, and through the chain 155.

As a result, the chain 155 circumferentially rotates and the engaging arm 156, which is connected to the chain 155, moves forward. The first push plate 139, which is connected to the lower end of the engaging arm 156, moves forward from the rear of the prestock passage 127. When it reaches the entrance of the prestock passage 127, as shown in FIG. 13, the motor 159 is halted, and the first push plate 139 halts its movement at the previously described position. Against this type of action of the first push plate 139, the coupling 140 is as previously described, usually withdrawn to the rear section of the storage conveyor 131. Because it always receives the rope tension from the weight 152, it is inclined to move forward. However, when the engaging arm 156 is positioned at the rear section of the storage conveyor 131, the connecting frame 157, which is attached to the coupling 140, engages with the engaging arm 156 so that the forward movement of the coupling 140 is prevented.

Accordingly, as previously described, when the engaging arm 156 moves, the coupling 140 also moves in the same direction as the engaging arm 156 as a result of the rope tension. At the position where the arm 156 halts, the movement of the coupling 140 also stops, engaged with the engaging arm 156, and the first push plate 139 joined to its lower end is positioned at the entrance to the prestock passage 127, to await the feeding of the machined material 16.

When the machined materials 16 are fed into the prestock passage 127 under such conditions, the first push plate 139 retreats by the amount equivalent to the moving portion of the machined material 16 while it remains engaged with the rear end surface of the machined material 16. After this, when the machined materials 16 are fed one by one, the first push plate 139 retreats corresponding to the movement of the tail of the machined material 16 equivalent to the amount of the machined material 16 cut or fed. The cut surfaces of the machined materials 16 which are fed into the prestock passage 127 face in the passage direction of the prestock passage 127. They are fed in, in sequence, and lined up with no space. The rear end surface of the last row is supported by the first push plate 139, and the front end surface of the first row is supported by the machined material 16 fed into the vises 87a, 87b. Furthermore, both ends are clamped and supported by the guide frames 124, 126 and are prevented from rolling.

When the prescribed amount of the prescribed machined material 16 is fed into the prestock passage 127, the previously described sensor senses that condition and outputs a signal to the motor 159, causing the motor 159 to go into reverse. When this happens, the chain 155 running between the sprockets 153, 154 also runs in the reverse direction from that previously described. The engaging arm 156 connected to the chain 155 moves toward the rear of the storage conveyor 131. Accordingly, the connector 140, which is engaged with the engaging arm 156 through the connecting frame 157, resists the rope tension from the weight 152 and moves to the rear, along with the engaging arm 156 and returns to its original position at the rear of the storage conveyor 131. As a result, the action of the first checkdown mechanism 128 is cancelled. However, with so many machined materials 16 lined up, they have already formed a uniform stability as a group so that they do not roll.

The machined material 16, which has been subjected to the desired machining by the machine tool 86, remains clamped in the vises 87a, 87b and moves with them in the forward direction. The movement of the vises 87a, 87b halts at the fully extended position indicated by the phantom line in FIG. 9. After the vises 87a, 87b are unclamped, it is subjected to the action by the remnant collection device 90.

The collection carrier 96, which is part of the remnant collection device 90, is usually positioned at the rear end section of the support 93, waiting to be activated. The action of the collection hook control cylinder (not shown in the drawings) which is positioned at the lower end of the collection carrier 96 is also halted and the piston rod 108 is retracted. Accordingly, the collection hook 104, of which one end is connected to the piston rod 108, waits for action with its engaging section 104a positioned at the upper part of the vises 87a, 87b.

Under such conditions, when the vises 87a, 87b, as previously stated, move to the release position and the clamp is released, the previously mentioned collection hook control cylinder is synchronously activated and the piston rod 108 is extended. For this reason, the collection hook 104 rotates around the pin 106, the engaging section 104a faces downward and is positioned in the transport region of the machined material 16 in the vises 87a, 87b, and this status is maintained. When in the formerly noted status of the clamp hook 104, the drive motor 99 starts, and the drive gear 100 attached to the drive shaft is driven. The power is transmitted to the screw shaft 101 through the gear 102 which engages with the gear 100, and the shaft 101 rotates synchronously with the gear 102.

As a result, the collection carrier 96, which is screwed onto one end of the screw shaft 101 and forms a screw mechanism together with the shaft 101, moves forward along the guide rails 94, 95. The collection hook 104 attached to the rear end section of the collection carrier 96 moves with it. After this movement takes place, the collection hook 104 passes through the vises 87a, 87b. At that time, it engages the rear end surface of the machined material 16 which has been released from the clamp of the vises 87a, 87b, and carries the machined material 16 forward. The collection carrier 96 moves further, and when the collection hook 104 reaches a position adjacent to the remnant selection device 74, the motor 99 halts, which halts the movement of the collection carrier 96. Accordingly, the collection hook 104 halts its movement at the rear end position of the remnant selection device 74, as indicated by the phantom line in FIG. 9.

In the case where the remaining quantity of the machined material 16 on the cylinder 79 of the remnant selection device 74 is less than a fixed length, a previously set signal is transmitted to the cylinder 79 of the remnant selection device 74 from the sensor mounted on the vises 87a, 87b. The piston rod 80 of the cylinder 79 retracts in response to this signal, and the table 76 connected to the tip of the piston rod 80 is rotated downward around the pin 77. A nonconveying region for the machined material 16 is previously formed between the front end of the table 82 and the rear end of the chute conveyor 65. Accordingly, as previously stated, the machined material 16, which is conveyed onto the remnant selection device 74 by the collection hook 104, rolls off, following along the table 76, after being conveyed to the non-conveying region, and is stored in the remnant collection box 81. In the case where the remaining amount of the machined component 16 is greater than a fixed length, no signal is transmitted from the sensor to the cylinder 79 so that the piston rod 80 stays in its original position and the table 76 is positioned in the conveying region of the machined material 16. Accordingly, the machined material 16 conveyed by the collection hook 104 is moved onto the table 76 and fed into the chute conveyor 65.

Only in the case where the remaining amount of the machined material 16 is greater than a fixed length, a signal is sent from the sensor to the drive motor for the chute conveyor 65, causing the motor to reverse. The machined material 16 which is sent back to the chute conveyor 65 is transported toward the delivery conveyor 25. The delivery conveyor 25 is still maintained in the lift status after feeding the machined material 16 to the machine tool as previously described. In addition, the erect status of the guide roller 45 is maintained, and the machined material 16 can be quickly received. Only in the case where the remaining amount of the machined material 16 is greater than a fixed length, a signal is sent from the sensor to the motor 40 for the delivery conveyor 25. When the motor 40 reverses, the sprockets 36, 27, 28 which are linked to it through the chain 39 also reverse. Therefore, the roller 42 attached to the roller shaft 30 which is an integral part of the sprocket 36 goes into reverse. For this reason, the machined material 16 which has been sent back onto the delivery conveyor 25 moves in the forward direction while being guided by the guide roller 45, and after moving to a set position, halts.

Following this, the motor 40 is halted. Then, when the cylinder 62 is retracted, retracting the piston rod 63, the roller 58, bearingly supported on the side frame 55 which is also driven with the rod 63, is moved from the high lift channel 61b within the cam 61 channel to the low lift channel 16a, and the movable frame 26 which is integral with the side frame 55 is lifted down and reverts to its original status. For this reason, the machined material 16, which was accommodated on the roller 42, is stored between the attachements 15, 15, and its lower circumferential surface is borne and supported on the guide rail 17. In addition, the cylinder 62 moves back and forth, and a cylinder not shown on the drawings is activated. The worm 51 and tie rod 53 which are connected to the piston rod of this cylinder are drawn back to the original position, causing the gear 50 which engages the worm 51 to be rotated in reverse. The guide roller 45, which is integrally attached to the gear 50 is rotated at the same time, and this roller 45 is returned to its original state. Then the delivery conveyor 25 returns to its original state, and when it is withdrawn from the conveying region of the machined material 16 which was transferred to a position the attachments 15, 15, it becomes possible to drive the chute conveyor 1. The machined material 16, which is scheduled to be machined, is conveyed to the position of delivery conveyor 25.

In addition, the motor 99 is driven in reverse after the collecting carrier 96 moves to a set position. The collecting carrier 96 is returned to its original position, and the piston rod 108 for the collection hook control cylinder mounted in the lower end of the collecting carrier 98 is retracted. The collection hook 104 is caused to rotate upward around the pin 106, and the engaging section 104a of the collection hook 104 is returned to its original position, and is withdrawn from the conveying region of the machined material 16.

Next, the prestock passage 127, as previously stated, moves to its second position, and when it proceeds to the push-out action for pushing out the machined materials 16 to the storage conveyor 131, the clearance check mechanism 195 and the second checkdown mechanism 129 are activated to provide for this action. Of these mechanisms, the clearance check mechanism 195, accompanies the movement of the movable table 114. When the pedestal 202 attached to the side of the table 114 moves in the upper right direction in FIG. 10, the roller 201, which is bearingly supported at the lower end of the pedestal 202, engages the tapered surface 199a of the movable table 199. The movable table 199 resists the restoring force of the spring 200, 200, is moved toward the rear, and is embedded in the space between the pedestal, 202 and the bucket 174. When the push-out action takes place, the movable table 199 forms the conveying passage for the machined materials 16.

The second checkdown mechanism 129 acts in the same way as the first checkdown mechanism 128, so an explanation of the duplicated portions will be omitted. Specifically, the second push plate 162 of the second checkdown mechanism 129 is usually withdrawn to the rear of the storage conveyor 131, as indicated by the phantom line in FIG. 13, waiting to be activated. After the prestock passage 127 has moved to the second position for the push-out action, the push plate 162 is activated by being linked to the motor 159. The chain 155 rotates circumferentially, driven by the motor 159, and when the engaging arm 156 connected to the chain 155 moves forward, the coupling 140, which is usually moved forward by the weight 152, moves in the same direction, following the engaging arm 156. The motor 159 halts when the engaging arm 156 almost reaches the upper part of the front end of the bucket 174, causing the engaging arm 156 to halt at the same position.

Accordingly, the coupling 140 contacts the engaging arm 156 through the connecting frame 157. Along with the halting of the motion, the second push plate 162 connected to the bottom of the connecting frame 157 is positioned in front of the bucket 174. It then engages the rear surface of the last of the machined materials 16 which were stored in the prestock passage 127 to await the action of the push-out cylinder 163.

Prior to this kind of action by the first and second checkdown mechanisms 128, 129, the circumferential rotation of the storage conveyor 131 is halted, and the bucket 174, with its upper and side parts opened, is positioned in a fixed position at the rear of the prestock passage 127. Accordingly, the bucket 174 moves intermittently, following along the circumferential region of the chain 172, and the bucket upper frame 176 is rotated closed at the rotating region on both sides and at the bottom circumferential region of the chain 172 to close the upper and lower aperture sections of the bucket 174. In addition, the bucket upper frame 176 is released by the pressure of the guide rails at the upper circumferential region of the chain 172, and is rotated open by the torsion spring 179, so that the aperture section is opened as shown in FIG. 14.

However, the side covers 187, 188 mounted on both sides of the bucket 174 normally cover up the side aperture section. Only when the bucket 174 is in the upper circumferential region of the chain 172 and moves to the rear of the first and second positions does this aperture section open. Specifically, in a location adjacent to each of these positions, each pair of pins 193, 194 projects into the conveyor frame 132, 132. When the engaging leaf 192 which projects on the side covers 187, 188 contacts these pins 193, 194, the side covers 187, 188 resist the torsion spring 191, 191 and rotate open facing upward, centered around the pins 190, 190. When the bucket 174 moves further in the same direction, it moves downward to the positions in sequence where the engaging leaf 192 contacts the engaging pins 193, 194. The degree of opening of the side covers 187, 188 increases, and at a point directly in front of the previously-mentioned first and second positions, as shown by the virtual line in FIG. 15, they are standing erect and the side aperture section of the bucket lower frame 175 is completely opened.

Accordingly, under such conditions, the upper and both side aperture sections of the bucket 174 are open. At each position there is communication with the prestock passage 127, so that movement of the first and second push plates 139, 162 becomes possible in the direction of the prestock passage 127. The bucket 174 moves to the previously-mentioned positions, halts, and is maintained at those positions. Because the engaged status of the engaging leaf 192 and the engaging pins 193, 194 is maintained, it is possible to transfer the machined materials 16 into the bucket 174. In addition, after the piston rod 113 of the power cylinder 112 is retracted, the clamp cylinder 118 retracts, and the guide plate 124 is separated from the other guide plate 126, releasing the clamping of the machined material 16.

When the preparations for the delivery of the machined material 16 to the bucket 174 are substantially completed, the push-out cylinder 163 is activated and its piston rod 165 projects into the prestock passage 127. The tip of the piston rod 165, in the process of extending, engages the end surface of the forwardmost portion of the machined material 16 stored in the prestock passage 127, and pushes it toward the rear. At that time, the second push plate 162 contacts the end surface of the rearmost portion of the machined material 16 and prevents the rolling of the machined material 16 when the push-out action takes place. It is then pushed against the rearmost portion of the machined material 16, and moves integrally with the machined material 16 opposing the tension of the rope from the weight 152. In this case, the guide plate 124 is withdrawn from the other guide plate 126, as previously discussed, and the machined material 16 is substantially guided to the inner circumferential surface of the guide plate 126 and is fed into the bucket 174.

When the machined material 16 is fed into the bucket 174 in this manner, the clamp cylinder 163 retracts and the piston rod 165 withdraws from the bucket 174. At the same time, the motor 159 goes into reverse and the engaging arm 156 which is joined to the chain 155 moves to the rear. When this movement takes place, the engaging arm 156 engages the frame 157 connected to the bottom end of the coupling 140, and causes the second push plate 162, which is jointed to the coupling 140, to move to the rear against the rope tension and be separated from the circumferential region of the storage conveyor 131.

Under such conditions, the storage conveyor 131 is driven intermittently, and the bucket 174 is moved at a specified pitch, at which time the engagement of the engaging leaf 192 and the engagement pins 193, 194 is released, and the side covers 187, 188 rotate to the closed position around the pin 190 from the effect of the torsion spring 191, 191 thereby closing the side aperture section of the bucket 174. Accordingly, the machined materials 16 in the rotating bucket 174 are prevented from falling out. The bucket 174 moves further along the upper circumferential region of the chain 172. When it reaches the rotating regions, the roller 182, which is bearingly supported at one end of the bucket upper frame 176, engages the upper inside circumferential surface of the guide rail 183 and is pushed downward, closing the upper aperture section of the bucket lower frame 175. When the bucket 174 moves to both rotating regions and lower side circumferential region of the chain 172, the roller 182 rolls along the guide rails 183, 184, 185, providing smooth movement and reducing the load on the chain 172. In addition, the aperture section of the bucket 174 is completely closed at this time, preventing the machined materials 16, which are stored inside the bucket 174, from falling out.

Furthermore, at a specific position of the conveying region of the storage conveyor 131, for example, at the position of the bucket 174 where all of its aperture sections are open, the push-out cylinder 163 is caused to project out in front of the push-out. The machined materials 16 in the bucket 174 are pushed out into a tubular or box-shaped stocker provided next to the bucket 174. In addition to emptying the bucket 174 in front of the pushout, it is desirable to prevent excess feed of the machined material 16 and to prevent feed of different varieties of the machined material 16 into the bucket 174. In addition, it is desirable to control the action of each drive section, supplying the machined material 16 to the machine tool 86 according to the geometrical form and quality of the machined material 16, and specifying the machining order and quantity to be machined, making full use of, for example, a microcomputer.

The automatic supply and storage system for machined materials of the present invention, as described above, comprises a feed conveyor which can line up and recycle a plurality of machined materials; a delivery conveyor moving back and forth from the conveying area of the feed conveyor to give to and take from the machined material the feed conveyor, and send and receive it in a direction transverse to the conveying direction of the feed conveyor; and a storage conveyor in which it is possible to intermittently recycle a plurality of buckets in which an aperture section can be opened and closed in both the vertical and sideways directions, wherein along with the capability of feeding the machined materials to the machine tool and, after feeding a specific amount, sending them back to the feed conveyor, it is possible to store the machined materials, after machining, in a prescribed bucket.

In addition, the system of the present invention comprises a delivery conveyor arranged in a direction transverse to the conveying direction of the feed conveyor with a guide roller which has been positioned to go back and forth from the transportation area of the feed conveyor to expedite the movement of the machined materials. As a result, in addition to the usual capability of conveying the machined materials with the feed conveyor, it is possible to provide accurate directional conveying of the machined material by the delivery conveyor, and accurate take-out positioning. In addition, the system of the present invention also comprises a remnant selection device positioned in the discharge end direction of the delivery conveyor to form a machined material transportation passage conforming to the quantity of machined material remnants. As a result, if the formation of the conveying passage can be formed only in the case where, for example, a remaining quantity of the machined materials are above a prescribed length, when the machined materials are set in it, they are automatically classified according to the remaining volume of the remnants, and there is the effect that it is possible to automatically select whether or not the system will be utilized.

Furthermore, the system of the present invention comprises a remnant collection device having a collection hook which can be positioned in the discharge end direction of the delivery conveyor to engage the end surface of the remnants of the machined materials to move them back to the remnant selection device. It is possible to automatically provide for the previously mentioned selection by means of the remnant selection device, and the transportation of the machined materials after machining.

In addition, in the system of the present invention, a prestock passage, which lines up and stores the machined materials after processing, is provided at the front of the storage conveyor, and at the time that the machined materials are processed, the prestock passage is positioned at the rear end of the conveying area for the machined materials which contact the delivery conveyor. After the prescribed quantity of the machined materials is stored, the machined materials can be discharged to the buckets of the storage conveyor at a set position separated from the previously mentioned position. As a result, with the system of the present invention, in addition to the capability of providing simple construction and reliable take-out action in comparison with a system in which take-out is directly carried out in the storage conveyor, a push plate is provided at a set position in the prestock passage, capable of going in and out of the prestock passage, and a checkdown mechanism is also provided to prevent the rolling of the machined materials engaging the push plate with the rear end section of the machined materials which are stored in the prestock passage. As a result, when the machined materials have been fed into the prestock passage, it is possible to systematically store them and prevent the rolling of these machined materials after they have been machined when they are taken out to the bucket of the storage conveyor.

Furthermore, in the system of the present invention a rotatable side cover is provided on both sides of each bucket on the storage conveyor. This side cover is normally rotated to the closed position, covering the sideways opening section of the side cover, and only when the bucket moves to a position directly opposite the prestock passage does the side cover rotate into the open position, uncovering its sideways opening section, so that the bucket and the prestock passage are in contact. As a result, it is possible to prevent the machined materials stored in the bucket from falling out, and when this aperture is open it is possible to transfer the machined materials from the prestock passage to the bucket to wait for the action of the push plate.

In addition, in the system of the present invention, a movable bed is interveningly provided between the bucket of the storage conveyor and the prestock passage, and a clearance check mechanism is provided which can create a conveyance route for the machined materials between the prestock passage and the bucket. As a result, the prestock passage is usually withdrawn from the circumferential region of the bucket, so that the recycle movement of the storage conveyor is possible, and when the machined material is transferred, by means of a transfer passage formed by a movable stand erected between the prestock passage and the bucket, the transfer can be performed smoothly and accurately.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An automatic supply and storage system for supplying machined material to a processing means and sorting said machined materials after processing by said processing means comprising:
   a feed conveyor having a conveying area and having means for aligning and recycling a plurality of machined materials in a conveying direction;
   a delivery conveyor which moves back and forth from the conveying area of the feed conveyor to transfer the machined materials from and to the feed conveyor, and send the machined material in a direction transverse to the conveying direction of the feed conveyor and toward the processing means; and
   a storage conveyor for receiving the machined materials from the processing means and for intermittently recycling a plurality of longitudinal buckets oriented so as to receive said machined materials in alignment with the longitudinal axes of said machined materials, said buckets having upper and lower longitudinal channels joined together to form an aperture section which is adapted to be opened and closed by movement of said channels.

2. The automatic supply and storage system for machined materials of claim 1, wherein said delivery conveyor has a guide roller connected to said delivery conveyor and arranged in a direction transverse to the conveying direction of the feed conveyor to guide the movement of the machined material, said guide roller being provided with means for moving the guide roller from a first position beneath machined material positioned on said delivery conveyor to a second position horizontally aligned with machined material positioned on said delivery conveyor in the transportation area of the feed conveyor.

3. The automatic supply and storage system for machined materials of claim 1, further comprising a remnant selection device positioned in the direction of the delivery conveyor toward said processing means to form a machined material transportation passage having means for conforming said transportation passage to the quantity of machined material remnants.

4. The automatic supply and storage system for machined materials of claim 3, wherein said remnant collection device has a collection hook which is positioned in the direction of the delivery conveyor toward said processing means so as to be adapted to engage the end surface of the remants of the machined materials to return the remnants in the direction of the remnant selection device.

5. The automatic supply and storage system for machined materials of claim 1, further comprising a prestock passage provided at the end of the storage conveyor receiving the machined material from the processing menas to line up and store the machined materials after processing, said prestock passage being movably mounted in a direction transverse to the direction of delivery of the machined materials by the delivery conveyor, wherein at the time that the machined materials are processed, the prestock passage is positioned in a first position at the rear end of the conveyoring area for the machined materials which contact the delivery conveyor, and after a prescribed quantity of the machined materials is stored in said prestock passage, the machined materials are adapted to be discharged to the buckets of the storage conveyor at a set position separated from said first position.

6. The automatic supply and storage system for machined materials of claim 5, wherein said machined materials are processed into sections for loading into said prestock passage and wherein said prestock passage has a push plate which can go in and out of the prestock passage and engage the rear end section of the machined materials which are stored in the prestock passage; and a check down mechanism positioned for cooperation with said prestock passage to prevent the rolling of the machined materials.

7. The automatic supply and storage system for machined materials of claim 1, further comprising a prestock passage provided at the end of the storage conveyor receiving the machined material from the processing means to line up and store the machined materials after processing, wherein a rotatable side cover provided on both sides of each of said buckets on the storage conveyor is normally rotated to the closed position, covering the transverse opening section of the side cover, and only when the bucket moves to a position directly opposite the prestock passage does the side cover rotate into the open position, uncovering its transverse opening section, so that the bucket and the prestock passage communicate with each other.

8. The automatic supply and storage system for machined materials of claim 7, further comprising a clearance check mechanism comprising:
   a movable bed interveningly provided between the bucket of the storage conveyor and the prestock passage to create a conveyance route for the machined materials between the prestock passage and the bucket.

* * * * *

UNITED STATES PATENT AND TRADEMARK OFFICE
CERTIFICATE OF CORRECTION

PATENT NO. : 4,737,068

DATED : April 12, 1988

INVENTOR(S) : NOBUMASA MOCHIZUKI

It is certified that error appears in the above-identified patent and that said Letters Patent is hereby corrected as shown below:

Column 9, line 65, delete "." after second occurrence of "the";
line 67, delete "," after "from";

Column 12, line 26, "rqllers" should be --rollers--;

Column 13, line 42, "pedstal" should be --pedestal--;

Column 16, line 45, "so called" should be --so-called--;

Column 21, line 3, delete "," after "pedestal".

IN THE CLAIMS:

Claim 1, line 2, "material" should be --materials--;
line 3, "sorting" should be --storing--.

Claim 4, line 6, "remants" should be --remnants--.

Claim 5, line 5, "menas" should be --means--;
line 11, "conveyoring" should be --conveying--.

Signed and Sealed this

Eighteenth Day of October, 1988

Attest:

DONALD J. QUIGG

Attesting Officer

Commissioner of Patents and Trademarks